(12) United States Patent
Tamura

(10) Patent No.: US 7,057,906 B2
(45) Date of Patent: *Jun. 6, 2006

(54) INSULATING SWITCHING DC/DC CONVERTER

(75) Inventor: Yoshimoto Tamura, Higashiyatsushiro-gun (JP)

(73) Assignee: Denso Corporation, Kariya (JP)

( * ) Notice: Subject to any disclaimer, the term of this patent is extended or adjusted under 35 U.S.C. 154(b) by 179 days.

This patent is subject to a terminal disclaimer.

(21) Appl. No.: 10/792,900

(22) Filed: Mar. 5, 2004

(65) Prior Publication Data

US 2004/0179377 A1    Sep. 16, 2004

(30) Foreign Application Priority Data

| Mar. 11, 2003 | (JP) | ............................. 2003-064808 |
| Mar. 11, 2003 | (JP) | ............................. 2003-064809 |
| Feb. 3, 2004 | (JP) | ............................. 2004-027087 |
| Feb. 3, 2004 | (JP) | ............................. 2004-027088 |

(51) Int. Cl.
   *H02M 3/335*    (2006.01)

(52) U.S. Cl. .................................. 363/21.04; 363/127

(58) Field of Classification Search .................. 363/16, 363/20, 21.01, 21.02, 21.12, 90, 91, 95, 127, 363/21.04
See application file for complete search history.

(56) References Cited

U.S. PATENT DOCUMENTS

| 4,695,935 A * | 9/1987 | Oen et al. ................... 363/21.1 |
| 4,760,512 A * | 7/1988 | Loftus ......................... 363/20 |
| 6,396,719 B1 * | 5/2002 | Morita et al. ............. 363/21.12 |
| 6,731,520 B1 * | 5/2004 | Schlecht ....................... 363/16 |
| 6,839,246 B1 * | 1/2005 | Zhang et al. ............. 363/21.06 |

OTHER PUBLICATIONS

Satoshi Tomioka, "Technique and Problem for Increasing Capacity of On-Board Power Supply," Switching Power Supply System Symposium 2000, Japan Management Association, B4-2.

Kosuke Harada, "Measures for Higher Harmonics of Switching Power Supply," first edition, Nikkan Kogyo Shimbun Ltd., Feb. 25, 1997, pp. 232-237.

* cited by examiner

*Primary Examiner*—Adolf Berhane
(74) *Attorney, Agent, or Firm*—Oliff & Berridge, PLC

(57) ABSTRACT

In a switching DC/DC converter using an insulating transformer Tr, a primary coil and a secondary coil of the transformer Tr, an input choke coil L1, and an output choke coil L3 are wound around a common core and are formed into a single component. A primary circuit of the transformer Tr includes a switching device Q1 connected in series with the primary coil, an input choke coil L1 connected across the terminals of the primary coil, and a series circuit of a clamp capacitor C1 and a switching device Q1' which are connected across the terminals of the primary coil. A secondary circuit of the transformer Tr includes rectifying switching devices Q2 and Q2' connected to the secondary coil, the output choke coil L3, and an output smoothing capacitor $C_0$. Further, a series circuit of the switching device Q1' and the clamp capacitor C1 may be connected across the terminals of the switching device Q1. The coils are arranged in directions of canceling DC fluxes generated by the coils, so that it is possible to greatly reduce the DC bias magnetization of the core, the volume of the core, and core losses, thereby achieving higher efficiency in the overall apparatus.

12 Claims, 27 Drawing Sheets

MODE1

MODE2

Tr PRIMARY CIRCUIT IS OMITTED

Tr PRIMARY CIRCUIT IS OMITTED

MODE1

MODE2

MODE7

MODE8

INSULATING SWITCHING DC/DC CONVERTER

BACKGROUND OF THE INVENTION

1. Field of the Invention

The present invention relates to a switching power supply, and more particularly to a technique for higher efficiency and miniaturization of an insulating switching DC/DC converter and a technique for reducing the number of components.

2. Description of the Related Art

Conventionally switching power supply circuits which use partial resonant circuits to have zero-voltage switching are proposed (Reference 1, Reference 2). FIG. 31 shows an example of a conventional circuit structure. In FIG. 31, reference character Vi designates an input voltage source, reference numeral C1 designates a clamp circuit, and reference numeral Q1' designates a switching device (e.g. MOSFET). Reference numeral Lr1 designates a leakage inductance which acts as an inductance for resonance. Reference numeral Tr1 designates a forward transformer (N: the number of turns of a primary coil, n: the number of turns of a secondary coil, N and n are natural numbers), and reference numeral Tr2 designates a flyback transformer (N: the number of turns of a primary coil, n: the number of turns of a secondary coil). Reference numeral Q1 designates a switching device (e.g. MOSFET), reference numerals Q2 and Q2' designate switching devices (e.g. MOSFET) acting as synchronous rectifying devices, reference numeral $C_O$ designates an output smoothing capacitor, and reference numeral $V_O$ designates an output DC voltage. The switching devices Q2 and Q2' have gate terminals driven by voltages obtained from the transformers Tr2 and Tr1, respectively.

Further, as a modification example of FIG. 31, a configuration shown in FIG. 32 is available in which a series circuit of a clamp capacitor C1 and a switching device Q1' is connected across the terminals of a switching device Q1.

The following will discuss the operation of the conventional circuit shown in FIG. 31. FIG. 33 shows the operation waveforms of the parts of the circuit shown in FIG. 31. In FIG. 33, reference characters VGS(Q1) and VGS(Q1') designate the gate voltages of the switching devices Q1 and Q1'. A control circuit (not shown) performs on/off control alternately on the two switching devices Q1 and Q1' so that one of the devices is turned off in a period when the other device is turned on, except for the periods of dead times when the devices are both turned off. The output DC voltage $V_O$ can be controlled by changing a ratio of an on period DT of the switching device Q1 to a duty cycle T (on duty ratio D). That is, the output DC voltage $V_O$ satisfies the relationship of the formula below.

$$V_O = (n/N) \times D \times Vi$$

In FIG. 33, reference characters VDS(Q1) and VDS(Q1') designate the waveforms of the drain-to-source voltages of the switching devices Q1 and Q1', respectively. Reference character ID(Q1) designates a sum of currents flowing to the switching device Q1, a body diode D1, and an output junction capacity C11. Reference character ID(Q1') designates a sum of currents flowing to the switching device Q1', a body diode D1', and an output junction capacity C12. Reference numeral ILr1 designates a primary current of the transformer Tr1. Reference numerals ILm1 and ILm2 designate magnetizing currents of the transformers Tr1 and Tr2.

The DC/DC converter circuit is divided into eight operating states of modes 1 to 8. FIGS. 34 to 41 show the equivalent circuits of the modes. Referring to the equivalent circuits corresponding to the modes, the operations will be outlined below.

[Mode 1; $t0 \leq t \leq t1$]

As shown in FIG. 34, in the period of mode 1, the switching devices Q1 and Q2 are turned on and energy is transmitted via the transformer Tr1 to the output side. At this point, the current of the transformer Tr2 is shut off and thus the transformer Tr2 operates as a choke coil for storing energy. In FIG. 34, reference numerals Lm1 and Lm2 designate magnetizing inductances of the transformers Tr1 and Tr2 and reference character RL designates a load resistance.

[Mode 2; $t1 \leq t \leq t2$]

In this period, when the switching device Q1 is turned off at t=t1, current continues to flow into the leakage inductance Lr1, so that charging is performed until the voltage of the output junction capacity C11 of the switching device Q1 becomes equal to the input voltage Vi(FIG. 35). Further, discharging is performed until the voltage of the output junction capacity C12 of the switching device Q1' becomes equal to a voltage Vc1 of the clamp capacitor C1.

[Mode 3; $t2 \leq t \leq t3$]

When the output junction capacity C12 is equal to the clamp capacitor C1 in voltage at t=t2, body diodes D2 and D2' of the switching devices Q2 and Q2' for synchronous rectification on the secondary side are turned on and the secondary side of the transformer is short-circuited (FIG. 36). Moreover, only the leakage inductance Lr1 acts as an inductance and resonates.

[Mode 4; $t3 \leq t \leq t4$]

In the period of mode 4, as shown in FIG. 37, the body diode D1' of the switching device Q1' is forward biased at t=t3, a current ID2 flowing into the body diode D2 decreases while the body diodes D2 and D2' are turned on, a current ID2' flowing into the body diode D2' increases, and the current ID2 becomes zero at t=t4.

[Mode 5; $t4 \leq t < t5$]

In the period of mode 5, the switching devices Q1' and Q2' are turned on as shown in FIG. 38 and energy stored in the magnetizing inductance Lm2 of the transformer Tr2 is transmitted to the secondary side. Meanwhile, the direction of the current of the switching device Q1' is changed from negative (dotted arrow in FIG. 38) to positive (solid arrow in FIG. 38).

[Mode 6; $t5 \leq t \leq t6$]

In the period of mode 6, when the switching device Q1' is turned off at t=t5, current continue flowing into the leakage inductance Lr1. Thus, the output junction capacity C11 is discharged to the input voltage Vi and the output junction capacity C12 is charged to the voltage Vc1 of the clamp capacitor C1 (FIG. 39).

[Mode 7; $t6 \leq t \leq t7$]

When a voltage Vc12 of the output junction capacity C12 becomes equal to the voltage Vc1 of the clamp capacitor C1 at t=t6 (Vc12=Vc1), the body diodes D2 and D2' are both turned on and the secondary side of the transformer is short-circuited (FIG. 40). Hence, only the leakage inductance Lr1 acts as an inductance and resonates.

[Mode 8; $t7 \leq t \leq t8$]

The body diode D1 of the switching device Q1 is forward-biased and is turned on at t=t7 (FIG. 41), a current ID2' decreases and the current ID2 increases while the body diodes D2 and D2' remain turned on. When the current ID2' becomes zero at t=t8, a transition is made to mode 1. During the period of mode 8, the direction of the current of the switching device Q1 is changed from negative (dotted arrow in FIG. 41) to positive (solid arrow in FIG. 41).

[Reference 1] Satoshi Tomioka, "Technique and Problem for Increasing Capacity of On-board Power Supply," Switching Power Supply System Symposium 2000, Japan Management Association, B4-2

[Reference 2] Kosuke Harada, "Measures for Higher Harmonics of Switching Power Supply," first edition, Nikkan Kogyo Shimbun Ltd., Feb. 25, 1997, pp. 232–237

However, the conventional circuit configuration is a so-called double-transform method. Although an output ripple voltage decreases, the core of magnetic components is considerably increased in total DC bias magnetization, the core has a large volume, core losses largely increase, and the overall apparatus has low efficiency. Furthermore, the conventional circuit configuration requires a large number of components.

SUMMARY OF THE INVENTION

The present invention is developed in view of such circumstances and has as an object the provision of a switching DC/DC converter whereby the core volume and core losses of magnetic components are reduced, the efficiency of the overall apparatus is improved, and the configuration of a circuit is devised so that the number of components can be reduced.

Another object of the present invention is to provide a switching DC/DC converter which reduces the number of components and achieves an apparatus with a small volume.

In order to attain the above objects, a first aspect of the present invention provides an insulating switching DC/DC converter, in which a DC voltage source is connected to the primary side of an insulating transformer, voltage is transformed by alternately turning on/off a first switching device and a second switching device so as not to simultaneously turn on the switching devices, the first and second switching devices being connected to the primary side, and the output of DC voltage is obtained via a secondary rectifier circuit of the insulating transformer, wherein an input choke coil, the primary coil of the insulating transformer, the secondary coil of the insulating transformer, and an output choke coil are wound around a common core, the coils are arranged in directions of canceling DC fluxes generated by the windings of the coils, a primary circuit is formed on the primary side of the insulating transformer, the primary circuit including the first switching device connected in series with the primary coil, the input choke coil connected across the terminals of the primary coil, and a series circuit of a clamp capacitor and the second switching device which are connected across the terminals of the primary coil, and a secondary circuit is formed on the secondary side of the insulating transformer, the secondary circuit including a first rectifying device and a second rectifying device which are connected to the secondary coil, the output choke coil connected to the first and second rectifying devices, and an output smoothing capacitor connected to the output choke coil.

According to the present invention, in the DC/DC converter using an insulating transformer, the input choke coil and the output choke coil are integrated with the insulating transformer, the primary coil and the secondary coil of the transformer and the input/output choke coils are wound around the same core (magnetic core), and the number of turns and the winding directions are designed in directions of canceling DC fluxes generated by the coils, so that the DC biased magnetization of the core is considerably reduced. Thus, it is possible to greatly miniaturize the volume of the core and reduce core losses as compared with the conventional art, thereby achieving a high-efficiency apparatus. Moreover, the circuit configuration can be realized by a single transformer. Hence, the number of components can be smaller than the double transform method.

Another aspect of the present invention has a primary circuit configured so that a connecting point of the series circuit of the clamp capacitor and the second switching device is changed in the primary circuit, and the series circuit of the clamp capacitor and the second switching device is connected across the terminals of the first switching device.

Additionally, in the circuit configuration of the present invention, it is also preferable to insert a capacitor in series with the primary coil (transformer primary winding) of the insulating transformer in order to prevent DC bias magnetization in the insulating transformer.

Still another aspect of the present invention is characterized in that in order to differentiate the input choke coil (primary choke winding) from the primary coil (transformer primary winding) of the insulating transformer beforehand, the coils are designed so as to have a difference in a degree of connection with the secondary coil of the transformer, so that the primary coil of the insulating transformer has a higher degree of connection and the input choke coil has a lower degree of connection.

(Effect of the First Aspect)

As described above, according to the first aspect of the present invention, the input choke coil and the output choke coil are integrated with the insulating transformer, the primary coil and the secondary coil of the transformer and the input/output choke coils are wound around the same core (magnetic core), and the coils are arranged in directions of canceling DC fluxes generated by the coils, so that the DC biased magnetization of the core is considerably reduced. Thus, it is possible to greatly miniaturize the volume of the core and reduce core losses as compared with the conventional art, thereby achieving a high-efficiency apparatus. Moreover, the circuit configuration can be realized by a single transformer. Hence, the number of components can be smaller than the double transform method.

Moreover, in order to attain the above objects, a second aspect of the present invention provides an insulating switching DC/DC converter, in which a DC voltage source is connected to the primary side of an insulating transformer, voltage is transformed by alternately turning on/off a first switching device and a second switching device so as not to simultaneously turn on the devices, the first and second devices being connected to the primary side, and the output of DC voltage is obtained via a secondary rectifier circuit of the insulating transformer, wherein an input choke coil, the primary coil of the insulating transformer, the secondary coil of the insulating transformer, and an output choke coil are wound around a common core, a primary circuit is formed on the primary side of the insulating transformer, the primary circuit including the first switching device connected in series with the primary coil, the input choke coil connected across the terminals of the primary coil, and a series circuit of a clamp capacitor and the second switching device which are connected across the terminals of the primary coil, and a secondary circuit is formed on the secondary side of the insulating transformer, the secondary circuit including a first rectifying device and a second rectifying device which are connected to the secondary coil, the output choke coil connected to the first and second rectifying devices, and an output smoothing capacitor connected to the output choke coil.

According to the present invention, in the DC/DC converter using an insulating transformer, the input choke coil and the output choke coil are integrated with the insulating transformer, the primary coil and the secondary coil of the transformer and the input/output choke coils are wound around the same core (magnetic core) to form a single component. In this way, the chokes and the transformer are formed into a single component and a converter circuit is realized by a single transformer. Thus, it is possible to reduce the number of components as compared with a conventional circuit.

Another aspect of the present invention has a primary circuit configured so that a connecting point of the series circuit of the clamp capacitor and the second switching device is changed in the primary circuit, and the series circuit of the clamp capacitor and the second switching device is connected across the terminals of the first switching device.

Additionally, in the circuit configuration of the present invention, it is also preferable to insert a capacitor in series with the primary coil (transformer primary winding) of the insulating transformer in order to prevent DC bias magnetization in the insulating transformer.

Still another aspect of the present invention is characterized in that in order to differentiate the input choke coil (primary choke winding) from the primary coil (transformer primary winding) of the insulating transformer beforehand, the coils are designed so as to have a difference in a degree of connection with the secondary coil of the transformer, so that the primary coil of the insulating transformer has a higher degree of connection and the input choke coil has a lower degree of connection.

(Effect of the Second Aspect)

As described above, according to the second aspect of the present invention, the input choke coil and the output choke coil are integrated with the insulating transformer, the primary coil and the secondary coil of the transformer and the input/output choke coils are wound around the same core (magnetic core) to form a single component. Thus, it is possible to reduce the number of components as compared with the conventional method. Further, a space factor is improved and the apparatus is reduced in volume. Moreover, although the second aspect has a large DC bias magnetization in the core as compared with the first aspect, the output has a smaller ripple current.

DETAILED DESCRIPTION OF THE PREFERRED EMBODIMENTS

Preferred embodiments of the present invention will be described in detail in accordance with the accompanying drawings.

Figure 1:
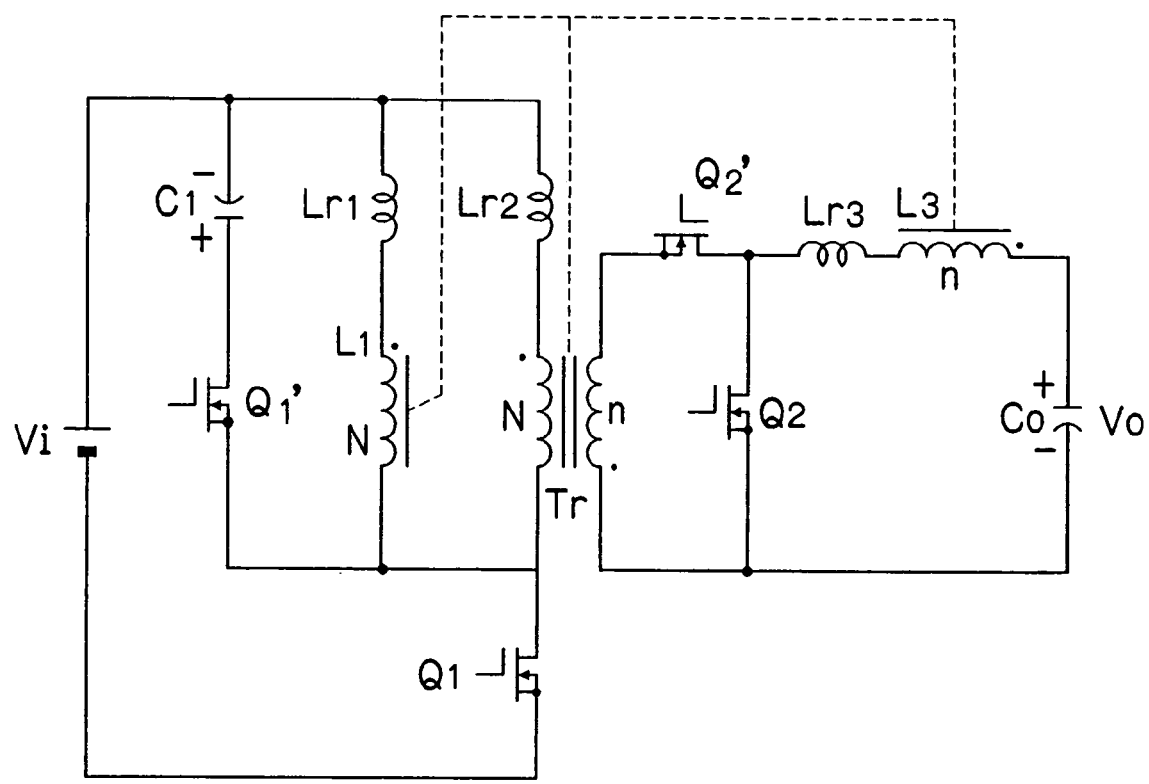
FIG. 1 is a circuit diagram showing a DC/DC converter according to Embodiment 1 of the present invention.

FIG. 1 is a circuit diagram showing a DC/DC converter (step-up active clamp forward converter). In FIG. 1, reference character Vi designates an input power supply, reference numeral C1 designates a clamp capacitor, reference numeral Q1' designates a switching device using a FET, reference numeral Lr1 designates a leakage inductance, reference numeral L1 designates an input choke coil (N: the number of turns, N is a natural number), reference numeral Lr2 designates a leakage inductance, reference character Tr designates an insulating transformer (N: the number of turns of a primary coil, n: the number of turns of a secondary coil, n is a natural number), reference numeral Q1 designates a switching device using a FET, reference numerals Q2 and Q2' designate switching devices acting as synchronous rectifying devices, reference numeral Lr3 designates a leakage inductance or a sum of an external insertion inductance and a leakage inductance, reference numeral L3 designates an output choke coil (n: the number of turns), reference numeral $C_0$ designates an output smoothing capacitor, and reference numeral $V_0$ designates an output DC voltage. Although MOSFETs are used for the switching devices Q1, Q1', Q2, and Q2' in the present embodiment, other semiconductor devices may be used in the implementation of the present invention.

The input/output choke coils L1 and L3 are integrated with the transformer Tr. The input/output choke coils L1 and L3 and the primary coil and the secondary coil of the transformer Tr are wound around a common core (e.g. EI core) and the coils are arranged in directions of canceling DC fluxes generated by the windings of the coils.

In order to differentiate the input choke coil L1 from the primary coil of the transformer Tr beforehand, the coils are designed beforehand so as to have a difference in a degree of connection with the secondary coil of the transformer Tr. The primary coil of the transformer Tr has a higher degree of connection with the secondary coil of the transformer Tr, and the input choke coil L1 has a lower degree of connection with the secondary coil of the transformer Tr. The configuration shown in FIG. 2 is available as an example of the windings of the transformer and the choke coils.

Figure 2:
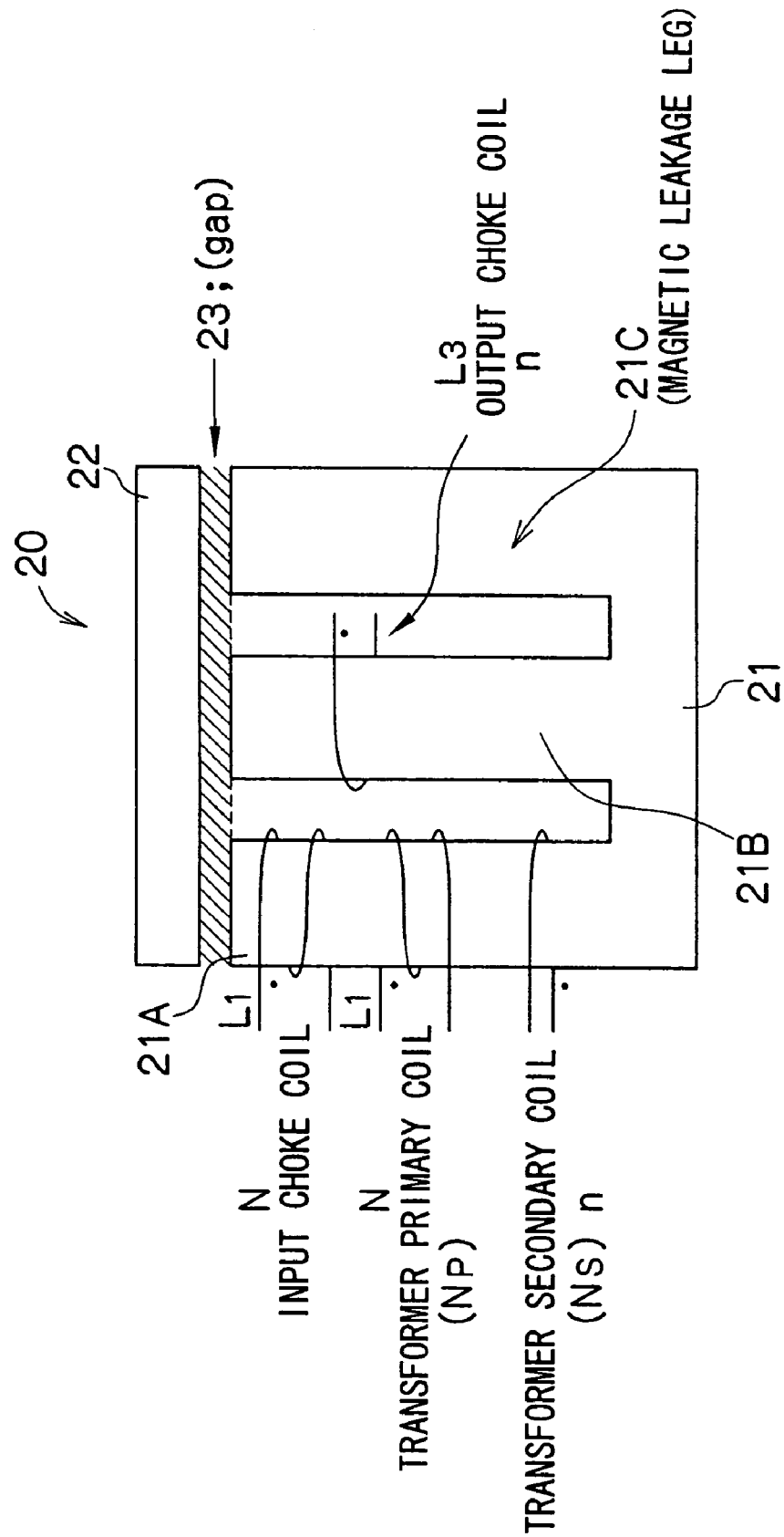
FIG. 2 is a diagram showing an example using an EI core.

FIG. 2 shows an example using an EI core. As shown in FIG. 2, an EI core 20 has a combination of an E core 21 and an I core 22. A gap 23 is provided on a connecting surface between the I core 22 and three magnetic legs 21A, 21B, and 21C of the E core 21.

As shown in FIG. 2, the input choke coil L1 and the primary coil Np (the number of turns is N) and the secondary coil Ns (the number of turns is n) of the transformer Tr are wound around the outer magnetic leg 21A of the E core 21. The output choke coil L3 with the number of turns n is wound around the central magnetic leg 21B. In FIG. 2, the outer magnetic leg 21C on the right is a magnetic leakage leg where a leakage flux flows.

As indicated by dots (•), the directions of the windings of the coils wound around the outer magnetic leg 21A and the central magnetic leg 21B are arranged so that magnetomotive forces cancel each other, which are generated on the coils when current is applied to the windings. In this way, a plurality of windings are combined and are arranged in directions of canceling DC fluxes, so that the core can be considerably reduced in DC bias magnetization. Ideally DC fluxes generated in the core can be reduced to zero and a core not having the gap 23 can be used for a UT core not having the magnetic leakage leg 21C. However, the magnetic leakage leg is actually used due to slightly unbalanced AC voltage.

Thus, the volume of the overall core is smaller, core losses can be reduced, and the overall apparatus can be improved in efficiency. The shape of the core is not limited to the EI core and an EE core and other shapes are also applicable in the implementation of the present invention.

The following will discuss the operation of the circuit shown in FIG. 1.

Figure 3:
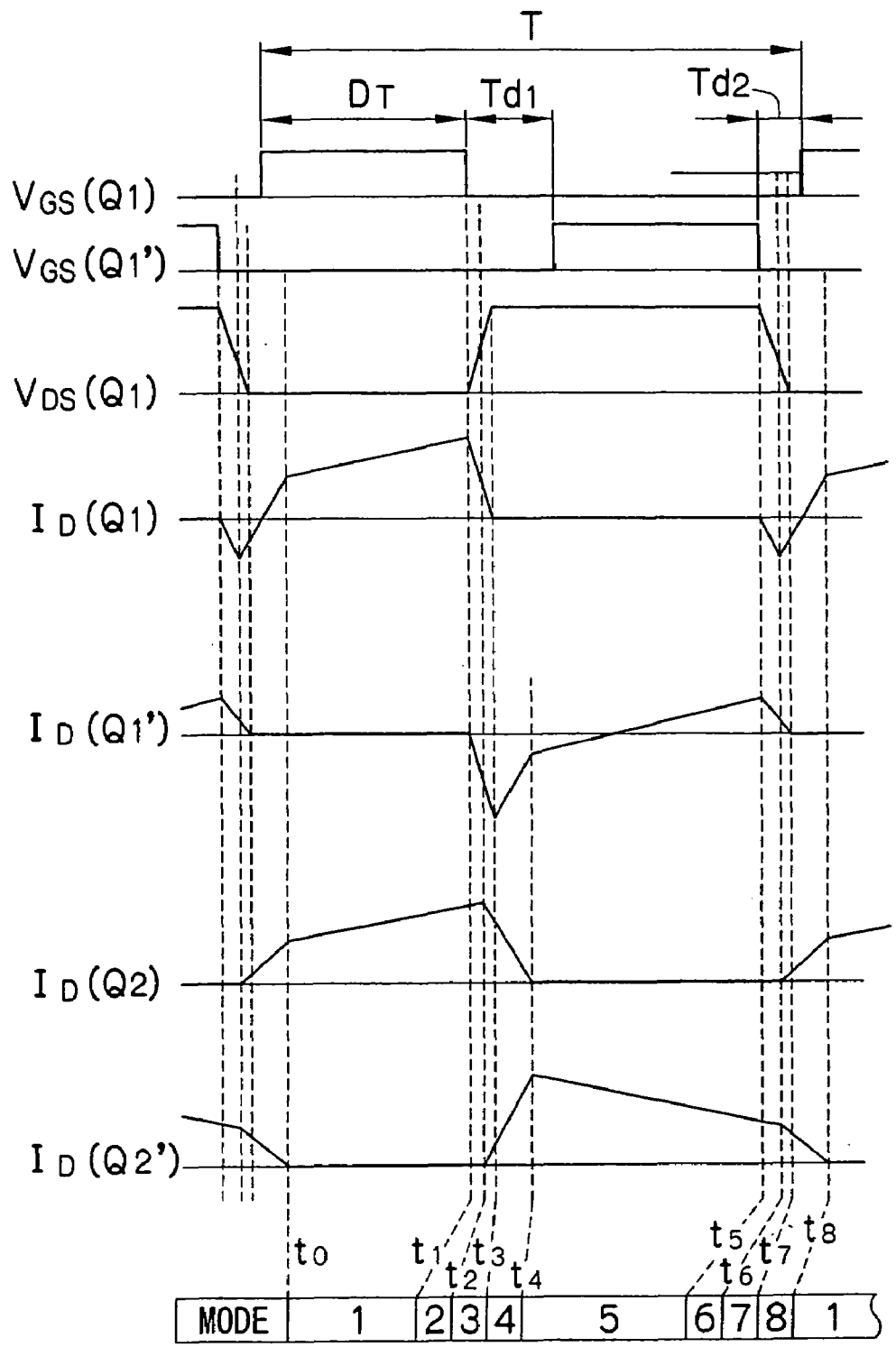
FIG. 3 is a diagram showing the operation waveforms of the parts of the circuit shown in FIG. 1.

FIG. 3 shows the operation waveforms of the parts of the circuit shown in FIG. 1. Periods other than mode 1 and mode 5 of FIG. 3 are shorter in reality.

In FIG. 3, reference characters VGS(Q1) and VGS(Q1') designate gate voltages of the switching devices Q1 and Q1', respectively. A control circuit (not shown) performs on/off control alternately on the two switching devices Q1 and Q1' so that one of the devices is turned off in a period when the other device is turned on, except for the periods of dead times Td1 and Td2. The output DC voltage $V_0$ can be controlled by changing a ratio of an on period DT of the switching device Q1 to a duty cycle T (on duty ratio D). The output DC voltage $V_0$ satisfies the relationship of the formula below.

$$V_0 = (n/N) \times D \times Vi$$

In FIG. 3, reference numeral VDS(Q1) designates the waveform of the drain-to-source voltage of the switching device Q1. Reference character ID(Q1) designates a sum of currents flowing to the switching device Q1, a body diode D1, and an output junction capacity C11. Reference character ID(Q1') designates a sum of currents flowing to the switching device Q1', a body diode D1', and an output junction capacity C12. Reference character ID(Q2) designates a sum of currents flowing to the switching device Q2 and a body diode D2. Reference character ID(Q2') designates a sum of currents flowing to the switching device Q2' and a body diode D2'.

In the present embodiment, the DC/DC converter circuit is divided into eight operating states of modes 1 to 8. FIGS. 4 to 11 show the equivalent circuits of modes 1 to 8. The operations will be outlined below with reference to the equivalent circuits corresponding to the modes.

[1] Mode 1; $t0 \leq t \leq t1$

Figure 4:
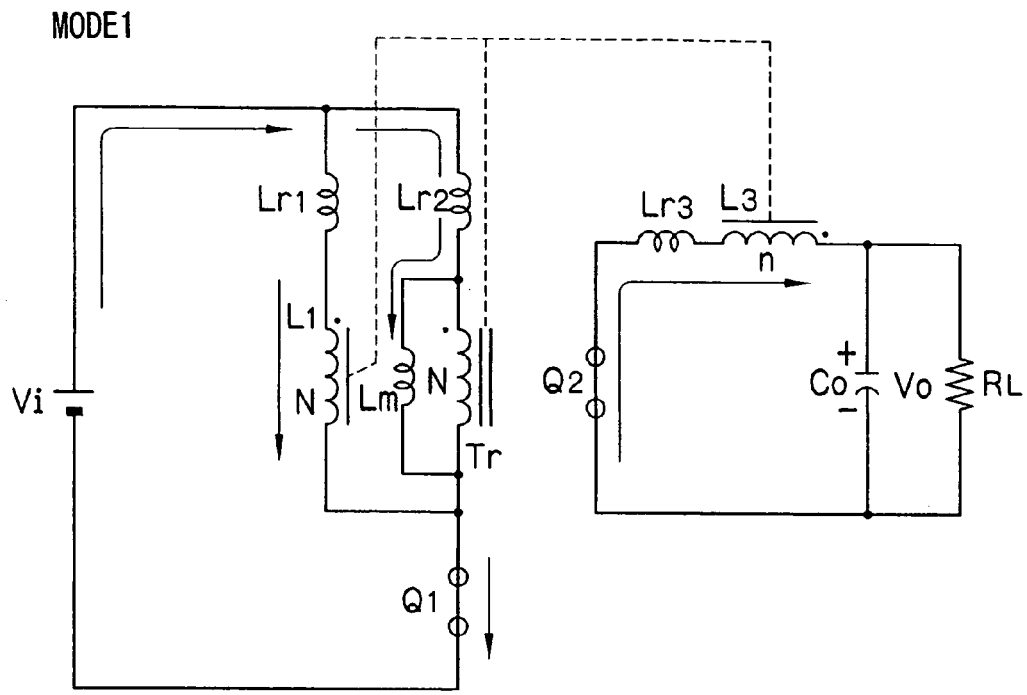
FIG. 4 is an equivalent circuit diagram showing the operation of mode 1 in the DC/DC converter of the present embodiment.

As shown in FIG. 4, in the period of mode 1, the switching devices Q1 and Q2 are turned on. Energy is transmitted via the output choke L3 to the output side. At this point, the current of the transformer Tr is shut off and thus only magnetizing current flows. In FIG. 4, reference character Lm designates the magnetizing inductance of the transformer Tr and reference character RL designates a load resistance.

[2] Mode 2; $t1 \leq t \leq t2$

Figure 5:
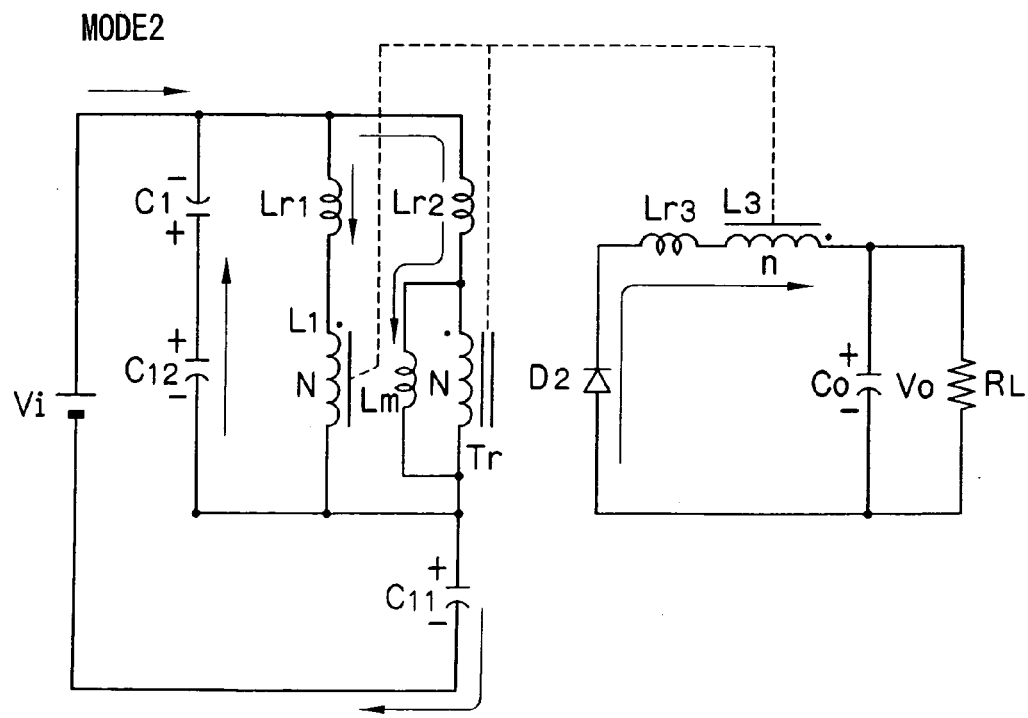
FIG. 5 is an equivalent circuit diagram showing the operation of mode 2 in the DC/DC converter of the present embodiment.

As shown in FIG. 5, after the switching device Q1 is turned off at t=t1, current continues flowing into the leakage inductances Lr1 and Lr2, so that the output junction capacity C11 of the switching device Q1 is charged and the output junction capacity C12 of the switching device Q1' is discharged. The voltage of the output junction capacity C11 is charged to the input voltage Vi, and the voltage of the output junction capacity C12 is discharged until the voltage becomes equal to the voltage of the clamp capacitor C1.

[3] Mode 3; $t2 \leq t \leq t3$

Figure 6:
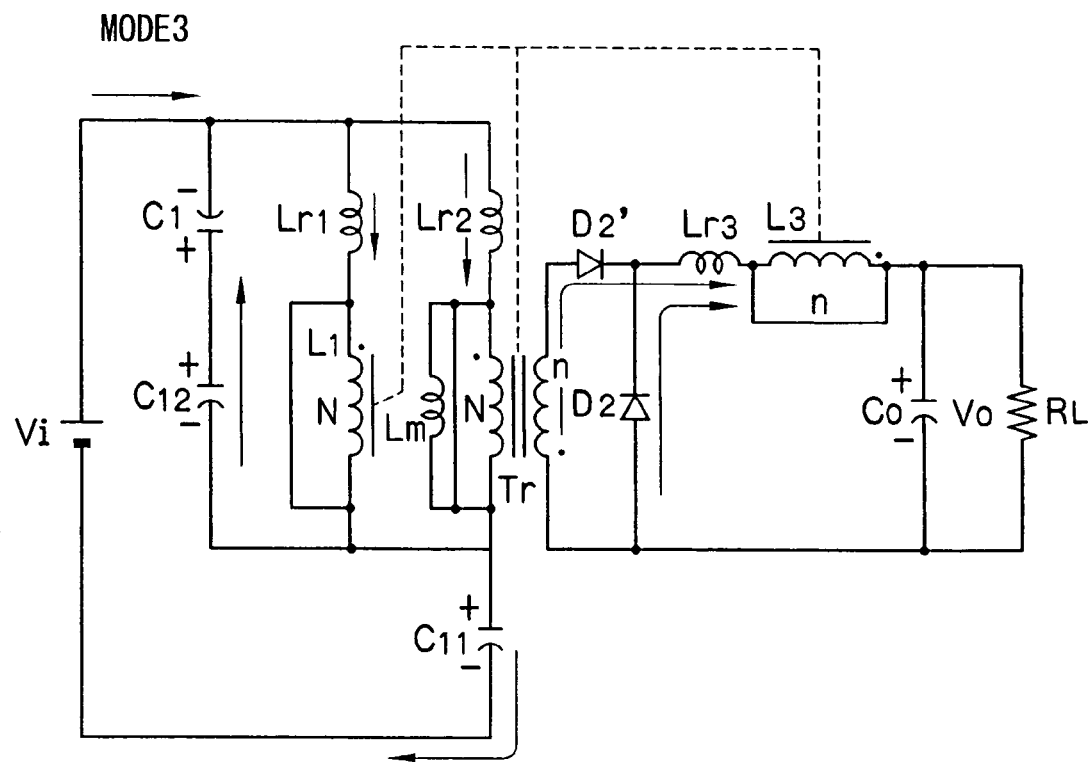
FIG. 6 is an equivalent circuit diagram showing the operation of mode 3 in the DC/DC converter of the present embodiment.

When the output junction capacity C12 and the clamp capacitor C1 become equal in voltage at t=t2, the body diodes D2 and D2' are both turned on and the secondary side of the transformer Tr is short-circuited (FIG. 6). During this period, only the leakage inductances Lr1 and Lr2 act as inductances and resonate.

[4] Mode 4; $t3 \leq t \leq t4$.

Figure 7:
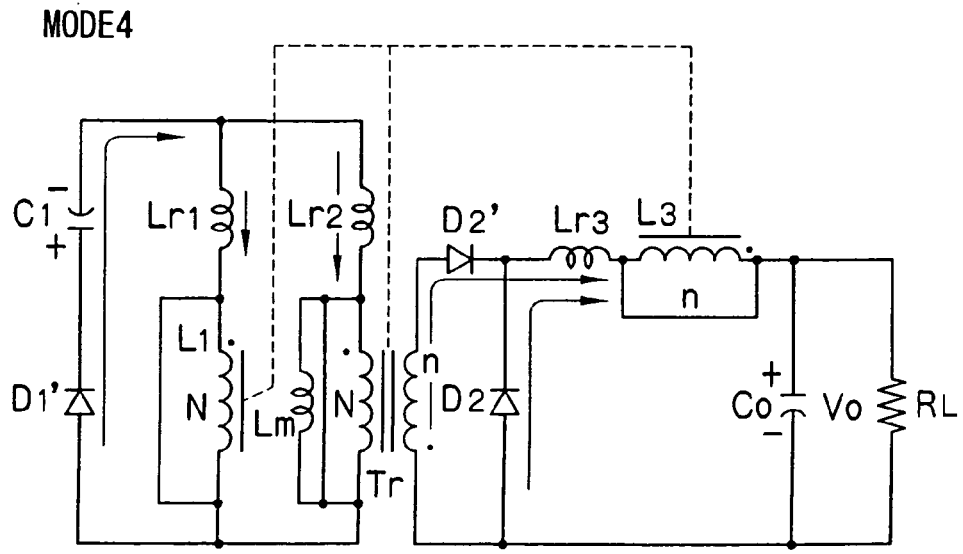
FIG. 7 is an equivalent circuit diagram showing the operation of mode 4 in the DC/DC converter of the present embodiment.

In the period of mode 4, the body diode D1' of the switching device Q1' is forward biased at t=t3 as shown in FIG. 7, the current ID2 decreases, the current ID2' increases, and the current ID2 becomes zero while the body diodes D2 and D2' remain turned on.

[5] Mode 5; $t4 \leq t \leq t5$

Figure 8:
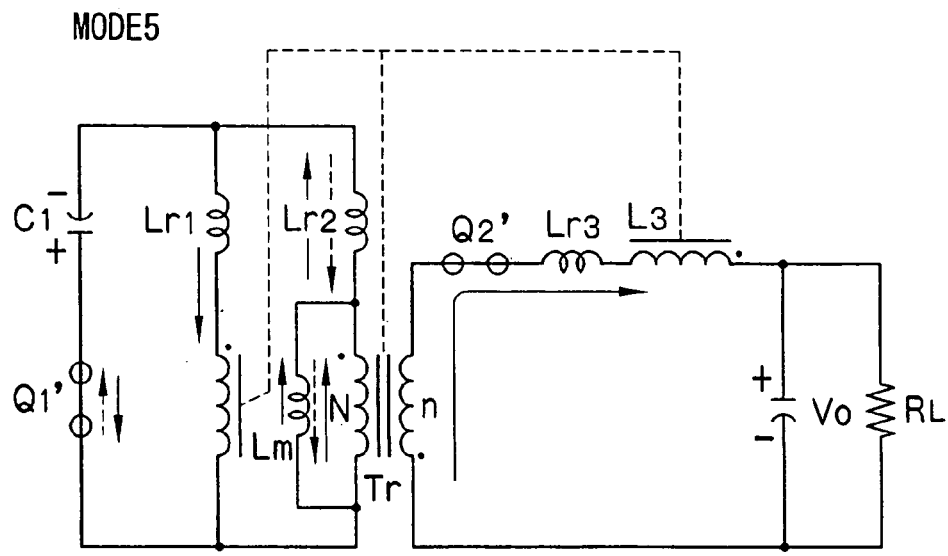
FIG. 8 is an equivalent circuit diagram showing the operation of mode 5 in the DC/DC converter of the present embodiment.
Figure 9:
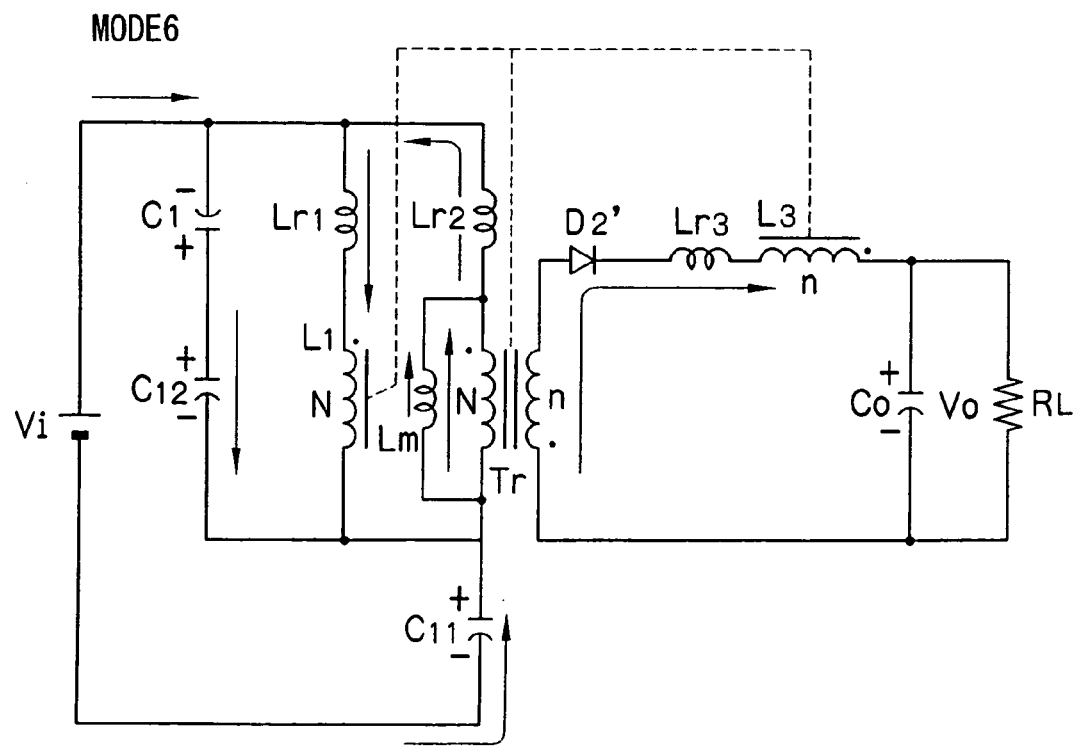
FIG. 9 is an equivalent circuit diagram showing the operation of mode 6 in the DC/DC converter of the present embodiment.

In the period of mode 5, the body diode D2 is turned off at t=t4 and the gate signal of the switching device Q1' is turned on at t=t5 as shown in FIG. 8. In mode 5, the switching devices Q1' and Q2' are both turned on. The direction of the current of the switching device Q1' is changed from negative (dotted arrow in FIG. 8) to positive (solid arrow in FIG. 8). Further, at t=t4, the windings of the transformer Tr are released from a short circuit and winding voltage is generated.

[6] Mode 6; $t5 \leq t \leq t6$

When the switching device Q1' is turned off at t=t5, as shown in FIG. 6, current continues flowing into the leakage inductances Lr1 and Lr2, so that the current is fed to a load current, the output junction capacity C1 is discharged to the input voltage Vi, and the output junction capacity C12 is charged to the voltage Vc1 of the clamp capacitor C1.

[7] Mode 7; $t6 \leq t \leq t7$.

Figure 10:
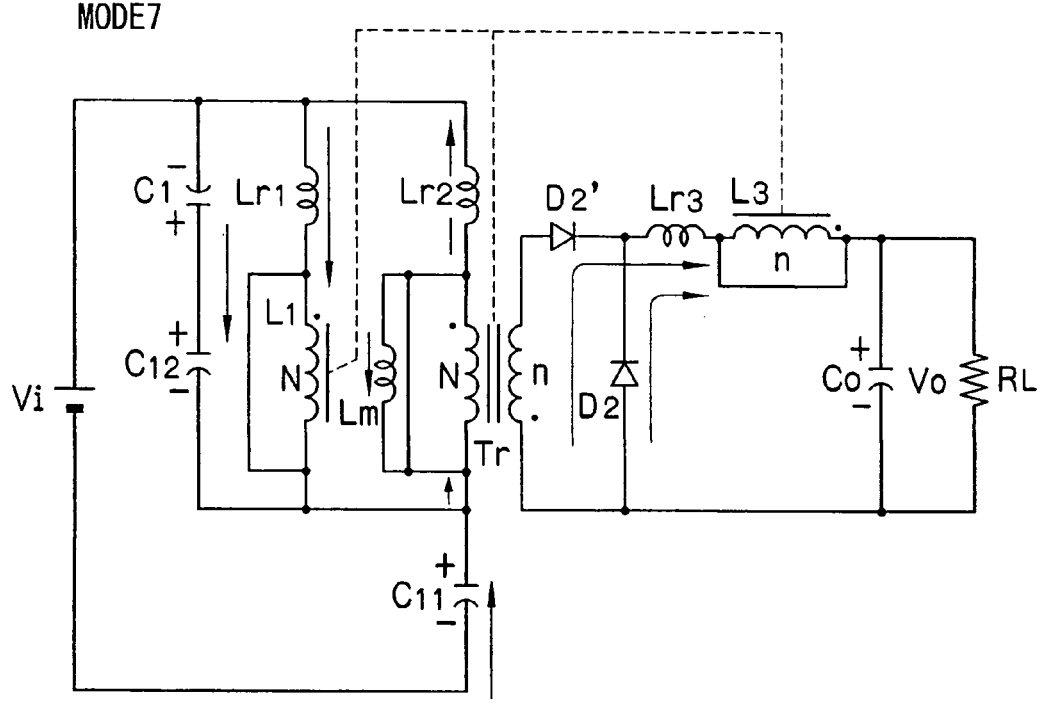
FIG. 10 is an equivalent circuit diagram showing the operation of mode 7 in the DC/DC converter of the present embodiment.

When the voltage Vc12 of the output junction capacity C12 becomes equal to the voltage Vc1 (Vc12=Vc1) at t=t6, the body diodes D2 and D2' are both turned on as shown in FIG. 10 and the secondary side of the transformer Tr is short-circuited. Hence, only the leakage inductances Lr1 and Lr2 act as inductances and resonate.

[8] Mode 8; $t7 \leq t \leq t8$

Figure 11:
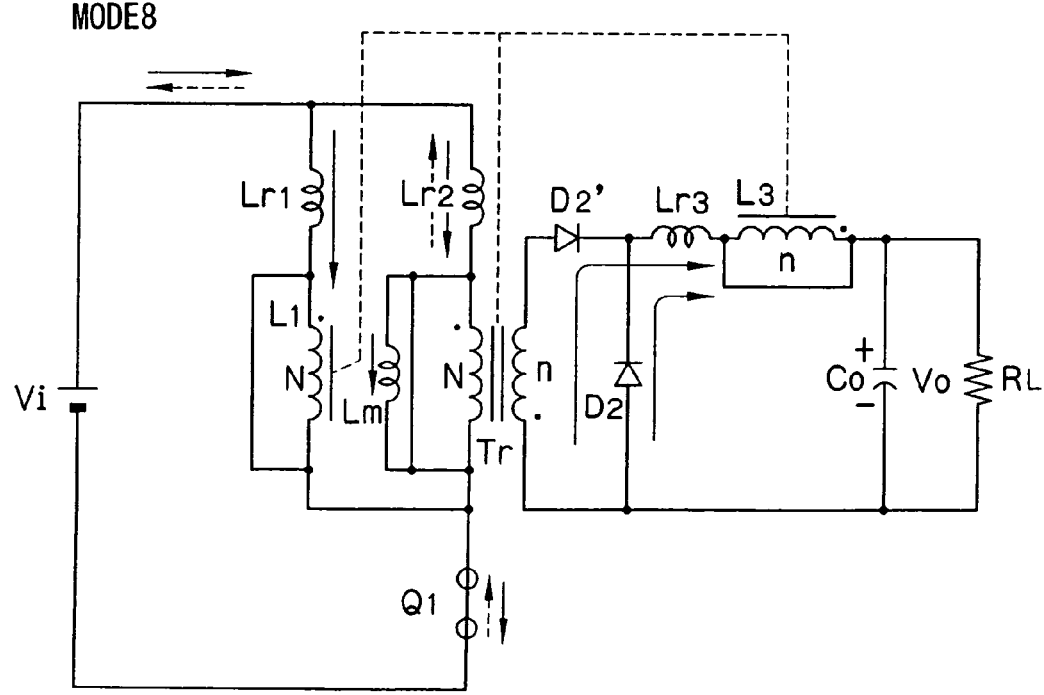
FIG. 11 is an equivalent circuit diagram showing the operation of mode 8 in the DC/DC converter of the present embodiment.

The body diode D1 of the switching device Q1 is forward biased and is turned on at t=t7 (FIG. 11). The current ID2' decreases and the current ID2 increases while the body diodes D2 and D2' remain turned on. When the current ID2' decreases to 0, a transition is made to mode 1. During the period of mode 8, the direction of the current of the switching device Q1 is changed from negative (dotted arrow in FIG. 11) to positive (solid arrow in FIG. 11).

According to the switching DC/DC converter in the present embodiment of the present invention, the input choke coil L1, the output choke coil L3, and the transformer Tr are integrated and are arranged in directions of canceling magnetic fluxes generated by the windings so as to considerably reduce the DC bias magnetization of the core. Thus, as compared with the conventional circuit configuration, it is possible to considerably miniaturize the core and largely reduce core losses, thereby greatly improving the efficiency of the overall apparatus and reducing the number of components.

Figure 12:
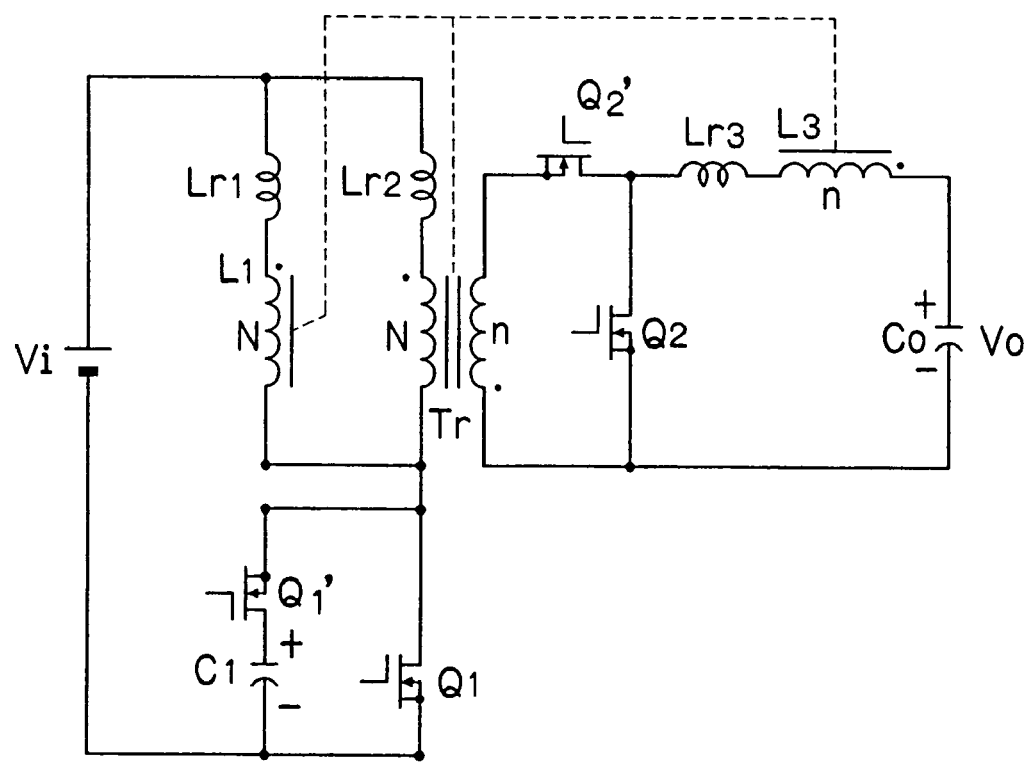
FIG. 12 is a circuit diagram showing Embodiment 2 of the present invention.
Figure 13:
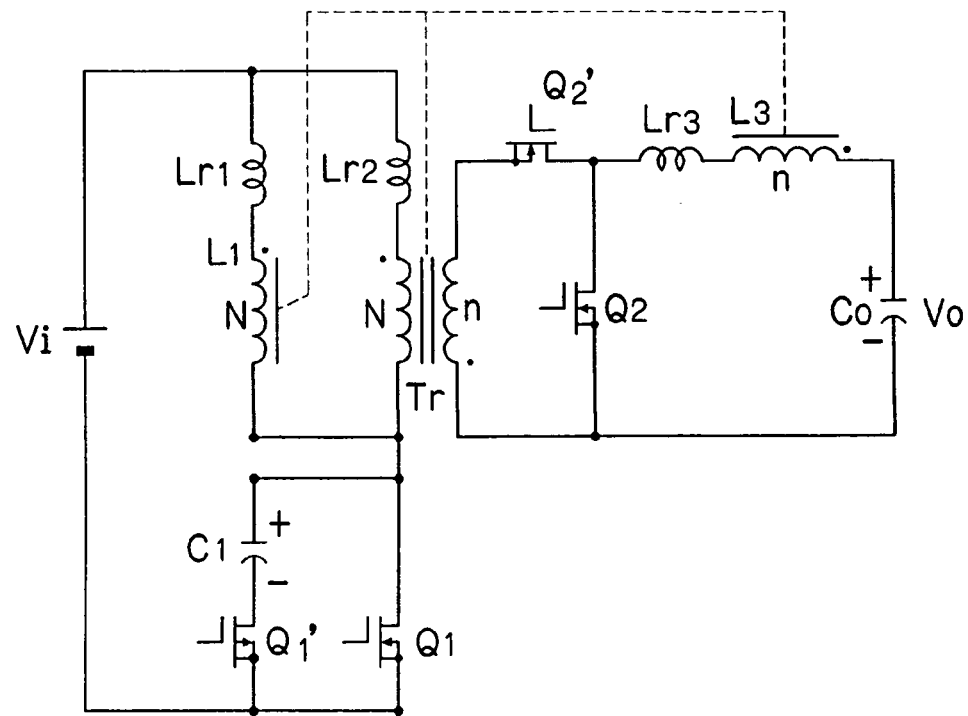
FIG. 13 is a circuit diagram showing Embodiment 3 of the present invention.
Figure 14:
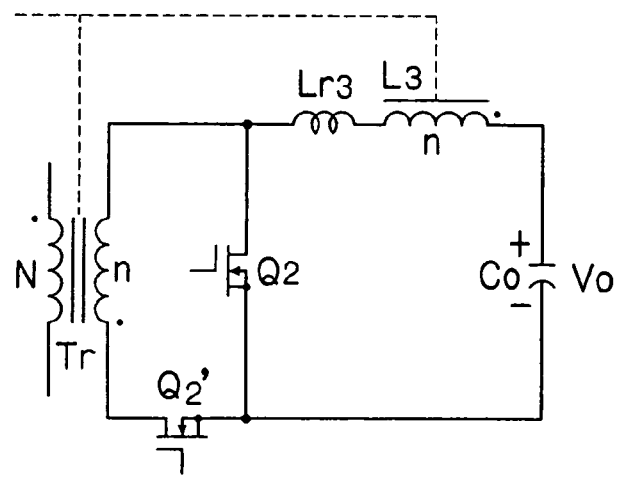
FIG. 14 is a circuit diagram showing Embodiment 4 of the present invention.

The applicable range of the present invention is not limited to the circuit configuration of FIG. 1 and various modifications are permitted. FIGS. 12 to 14 show modification examples of the circuit. Main differences of the circuits from the circuit of FIG. 1 will be discussed below and the explanation of circuit operations is omitted. In FIGS. 1, 12, and 13, the switching device Q1 is inserted under a DC bus. The switching device Q1 may be inserted on the DC bus.

The circuit of FIG. 12 is different from the circuit of FIG. 1 in the connecting point of the series circuit of the capacitor C1 and the switching device Q1'. In FIG. 12, the series circuit of the switching device Q1' and the capacitor C1 is connected across the terminals of the switching device Q1.

The circuit of FIG. 13 is different from that of FIG. 12 in that the connecting order of the capacitor C1 and the switching device Q1' is reversed and a P-channel MOSFET is used for the switching device Q1'.

Furthermore, the configuration shown in FIG. 14 is also applicable as the secondary circuit of the transformer Tr. A circuit configuration shown in any one of FIGS. 1, 12, and 13 can be used as the primary circuit of the transformer Tr (not shown in FIG. 14). The circuit of FIG. 14 is different from that of FIG. 1 in the connecting point of the switching device Q2'.

Figure 15:
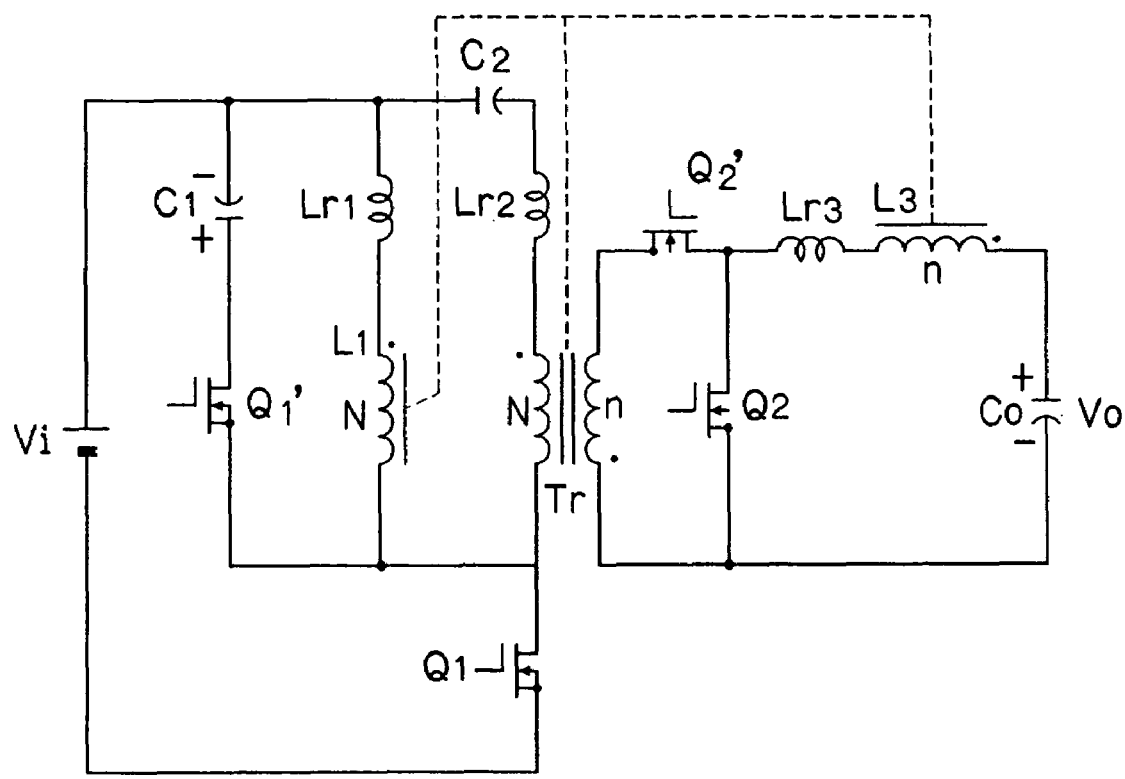
FIG. 15 is a circuit diagram showing Embodiment 5 of the present invention.

FIG. 15 is a circuit diagram showing still another embodiment of the present invention. In FIG. 15, parts similar to those of FIG. 1 are indicated by the same reference numerals and the explanation thereof is omitted. In FIG. 15, in order to prevent the DC bias magnetization of the transformer Tr, the capacitor C2 is inserted in series with a primary winding (primary coil Np) of the-transformer.

FIG. 15 shows an example where the capacitor C2 is added to the circuit diagram of FIG. 1. Similarly in the circuit diagrams of FIGS. 12 and 13, the capacitor C2 can be inserted in series with the primary winding (primary coil Np) of the transformer.

Another embodiment of the present invention will be described below.

Figure 16:
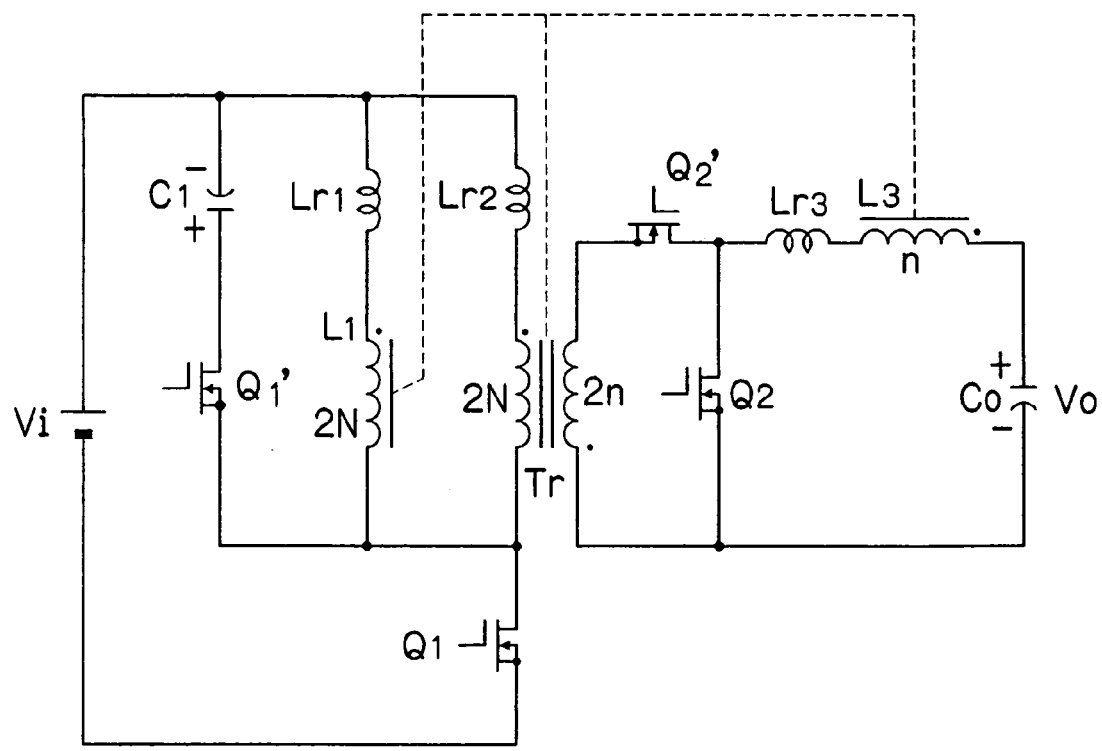
FIG. 16 is a circuit diagram showing a DC/DC converter according to Embodiment 6 of the present invention.

FIG. 16 is a circuit diagram showing a DC/DC converter (step-up active clamp forward converter). In FIG. 16, reference character Vi designates an input power supply, reference numeral C1 designates a clamp capacitor, reference numeral Q1' designates a switching device using a FET, reference numeral Lr1 designates a leakage inductance, reference numeral L1 designates an input choke coil (2N: the number of turns, N is a natural number), reference numeral Lr2 designates a leakage inductance, reference character Tr designates an insulating transformer (2N: the number of turns of a primary coil, 2n: the number of turns of a secondary coil, n is a natural number), reference numeral Q1 designates a switching device using a FET, reference numerals Q2 and Q2' designate switching devices acting as synchronous rectifying devices, reference numeral Lr3 designates a leakage inductance or a sum of an external insertion inductance and a leakage inductance, reference numeral L3 designates an output choke coil (n: the number of turns), reference numeral $C_O$ designates an output smoothing capacitor, and reference numeral $V_O$ designates an output DC voltage. Although MOSFETs are used as the switching devices Q1, Q1', Q2, and Q2' in the present embodiment, other semiconductor devices may be used in the implementation of the present invention.

The input/output choke coils L1 and L3 are integrated with the transformer Tr. The input/output choke coils L1 and L3 and the primary coil and the secondary coil of the transformer Tr are wound around a common core (e.g. EI core).

In order to differentiate the input choke coil L1 from the primary coil of the transformer Tr beforehand, the coils are designed beforehand so as to have a difference in a degree of connection with the secondary coil of the transformer Tr. The primary coil of the transformer Tr has a higher degree of connection with the secondary coil of the transformer Tr, and the input choke coil L1 has a lower degree of connection with the secondary coil of the transformer Tr. The configuration shown in FIG. 17 is available as an example of the windings of the transformer and the choke coils.

Figure 17:
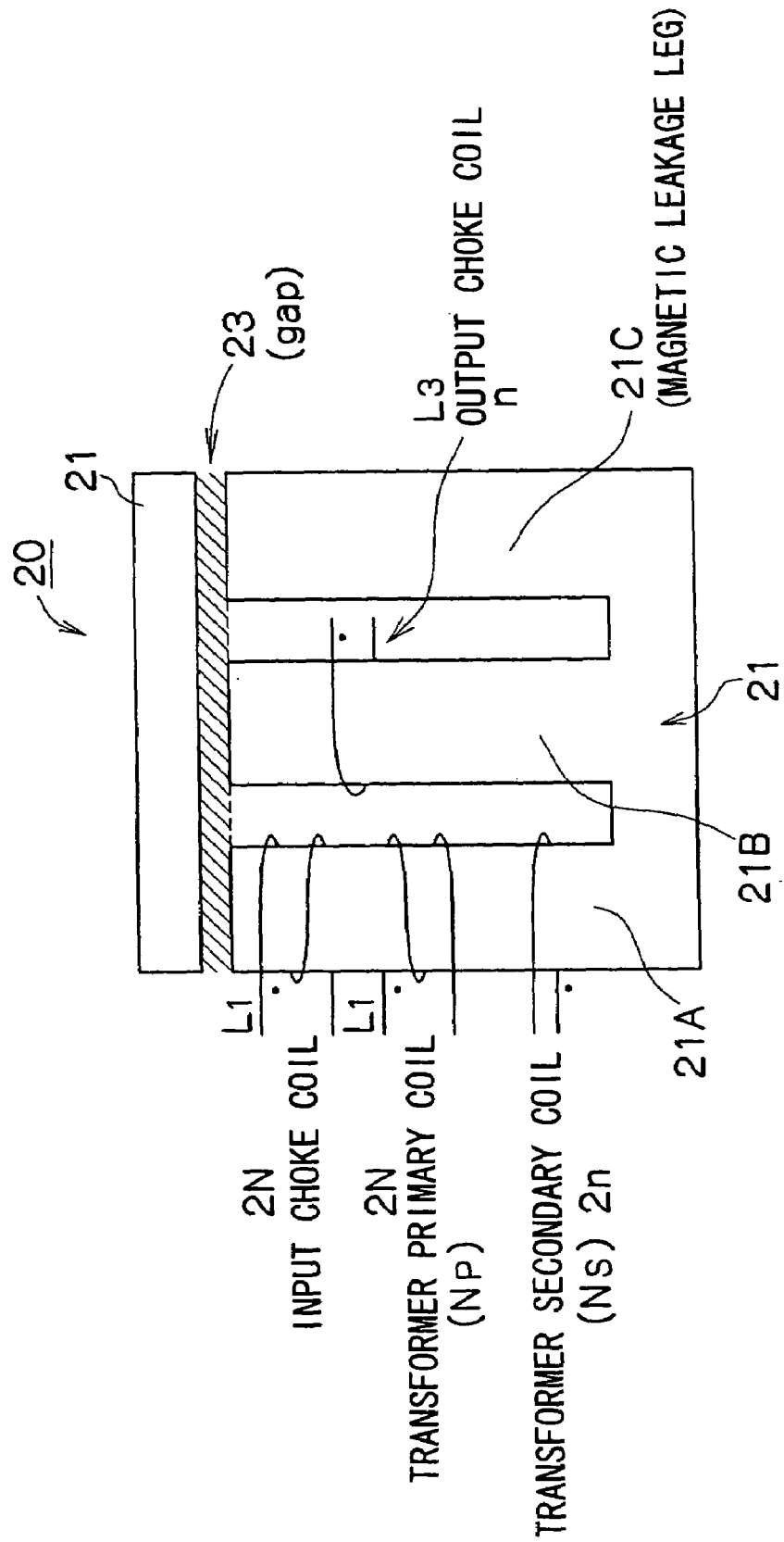
FIG. 17 is a diagram showing an example where an EI core is used in the example of FIG. 16.

FIG. 17 shows an example using an EI core. As shown in FIG. 17, an EI core 20 has a combination of an E core 21 and an I core 22. A gap 23 is provided on a connecting surface between the I core 22 and three magnetic legs 21A, 21B, and 21C of the E core 21.

As shown in FIG. 17, the input choke coil L1 and a primary coil Np (the number of turns is 2N) and a secondary coil Ns (the number of turns is 2n) of the transformer Tr are wound around the outer magnetic leg 21A of the E core 21. The output choke coil L3 with the number of turns n is wound around the central magnetic leg 21B. In FIG. 17, the outer magnetic leg 21C on the right is a magnetic leakage leg where a leakage flux flows.

According to the present embodiment, the input/output choke coils L1 and L3 are integrated with the transformer Tr as a single component, so that the number of components of a main circuit can be reduced and the volume of the overall apparatus can be smaller. The shape of the core is not limited to the EI core and an EE core and other shapes are also applicable in the implementation of the present invention.

The following will discuss the operation of the circuit shown in FIG. 16.

Figure 18:
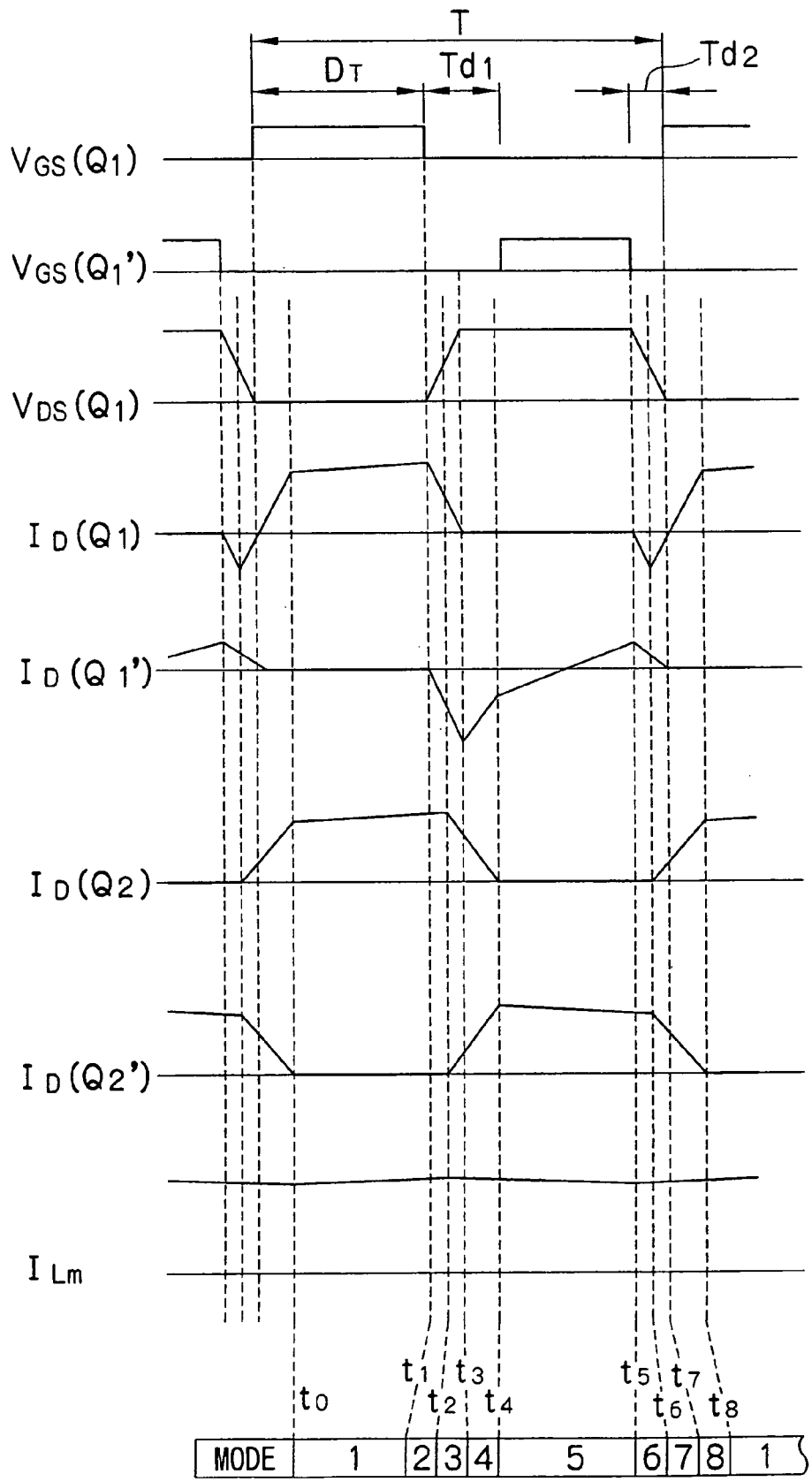
FIG. 18 is a diagram showing the operation waveforms of the parts of the circuit shown in FIG. 16.

FIG. 18 shows the operation waveforms of the parts of the circuit shown in FIG. 16. Periods other than mode I and mode 5 of FIG. 18 are shorter in reality.

In FIG. 18, reference characters VGS(Q1) and VGS(Q1') designate gate voltages of the switching devices Q1 and Q1', respectively. A control circuit (not shown) performs on/off control alternately on the two switching devices Q1 and Q1' so that one of the devices is turned off in a period when the other device is turned on, except for the periods of dead times Td1 and Td2. The output DC voltage $V_O$ can be controlled by changing a ratio of an on period DT of the switching device Q1 to a duty cycle T (on duty ratio D). The output DC voltage $V_O$ satisfies the relationship of the formula below.

$$V_O = (n/N) \times D \times Vi$$

In FIG. 18, reference numeral VDS(Q1) designates the waveform of the drain-to-source voltage of the switching device Q1. Reference character ID(Q1) designates a sum of currents flowing to the switching device Q1, a body diode D1, and an output junction capacity C11. Reference character ID(Q1') designates a sum of currents flowing to the switching device Q1', a body diode D1', and an output junction capacity C12. Reference character ID(Q2) designates a sum of currents flowing to the switching device Q2 and a body diode D2. Reference character ID(Q2') designates a sum of currents flowing to the switching device Q2' and a body diode D2'. Reference character ILm designates the magnetizing current of the transformer Tr.

In the present embodiment, the DC/DC converter circuit is divided into eight operating states of modes 1 to 8. FIGS. 19 to 26 show the equivalent circuits of modes 1 to 8. The operations will be outlined below with reference to the equivalent circuits corresponding to the modes.

[1] Mode 1; $t0 \leq t \leq t1$

Figure 19:
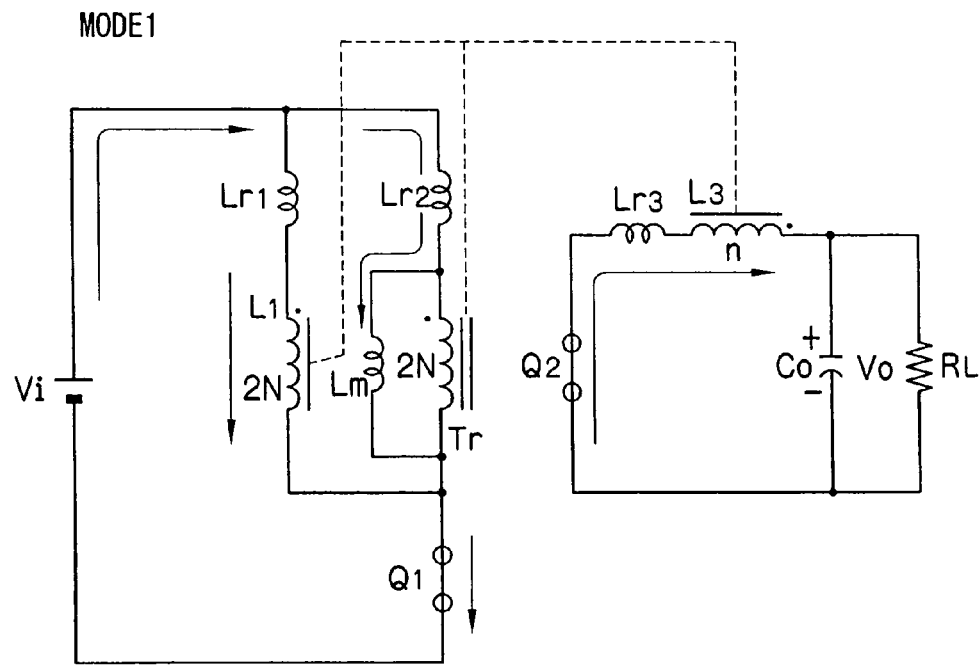
FIG. 19 is an equivalent circuit diagram showing the operation of mode 1 in the DC/DC converter of FIG. 16.

As shown in FIG. 19, in the period of mode 1, the switching devices Q1 and Q2 are turned on. Energy is transmitted via the output choke L3 to the output side. At this point, the current of the transformer Tr is shut off and thus only magnetizing current flows. In FIG. 19, reference character Lm designates the magnetizing inductance of the transformer Tr and reference character RL designates a load resistance.

[2] Mode 2; $t1 \leq t \leq t2$

Figure 20:
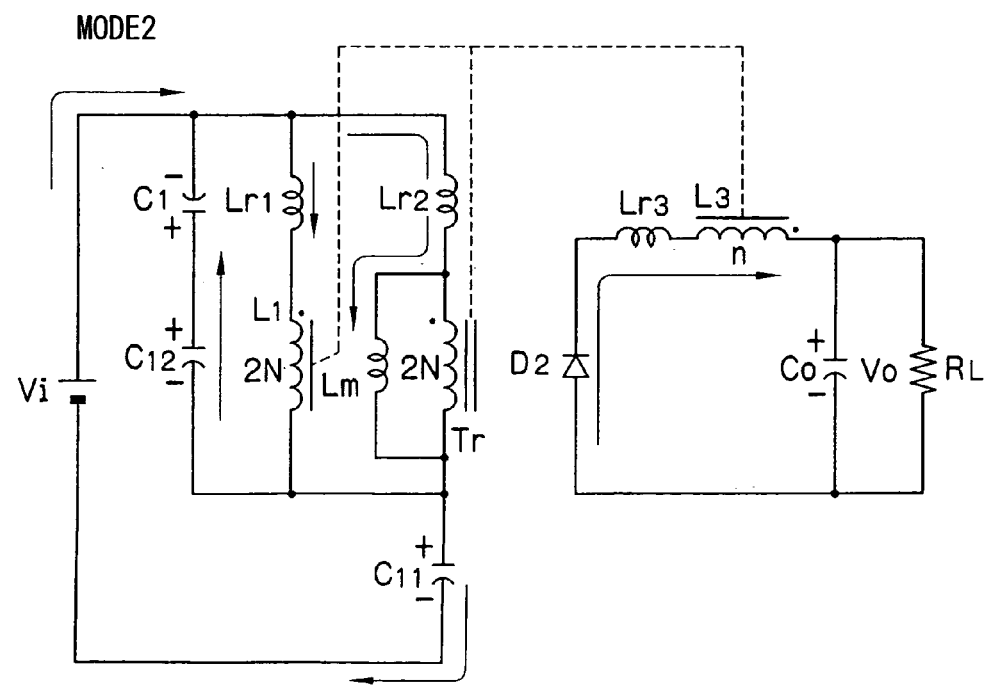
FIG. 20 is an equivalent circuit diagram showing the operation of mode 2 in the DC/DC converter of FIG. 16.

As shown in FIG. 20, after the switching device Q1 is turned off at t=t1, current continues flowing into the leakage inductances Lr1 and Lr2, so that the output junction capacity C11 of the switching device Q1 is charged to the input voltage Vi and the voltage of the output junction capacity C12 of the switching device Q1' is discharged until the voltage becomes equal to the voltage of the clamp capacitor C1.

[3] Mode 3; $t2 \leq t \leq t3$

Figure 21:
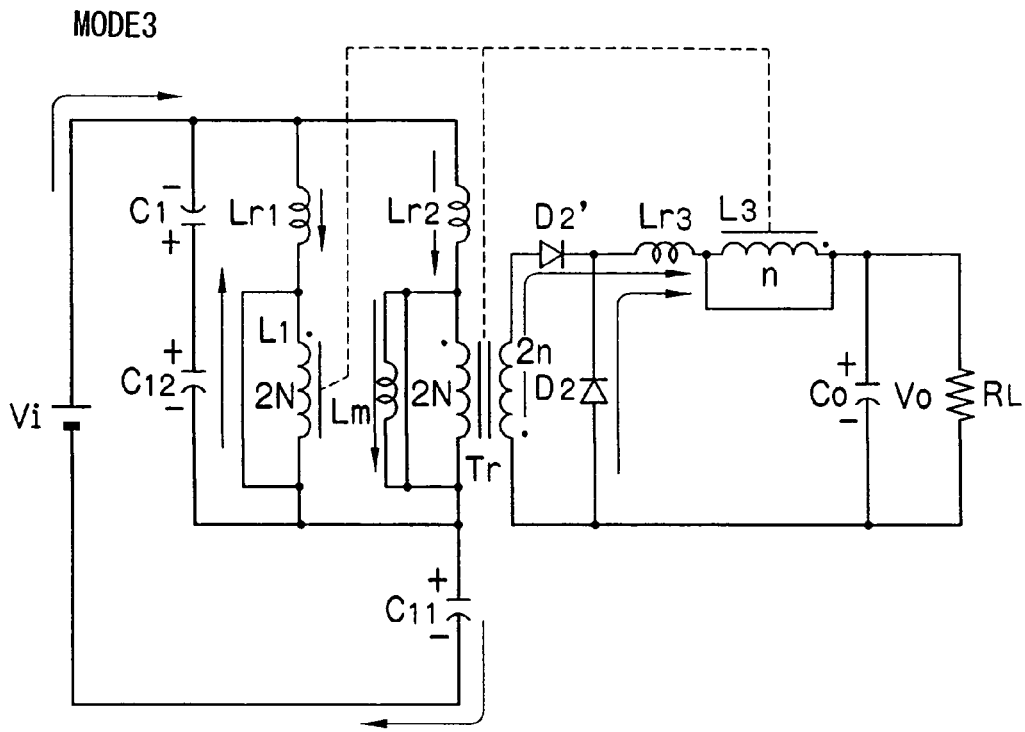
FIG. 21 is an equivalent circuit diagram showing the operation of mode 3 in the DC/DC converter of FIG. 16.

When the output junction capacity C12 and the clamp capacitor C1 become equal in voltage at t=t2, the body diodes D2 and D2' are both turned on and the secondary side of the transformer Tr is short-circuited (FIG. 21). During this period, only the leakage inductances Lr1 and Lr2 act as inductances and resonate.

[4] Mode 4; $t3 \leq t \leq t4$

Figure 22:
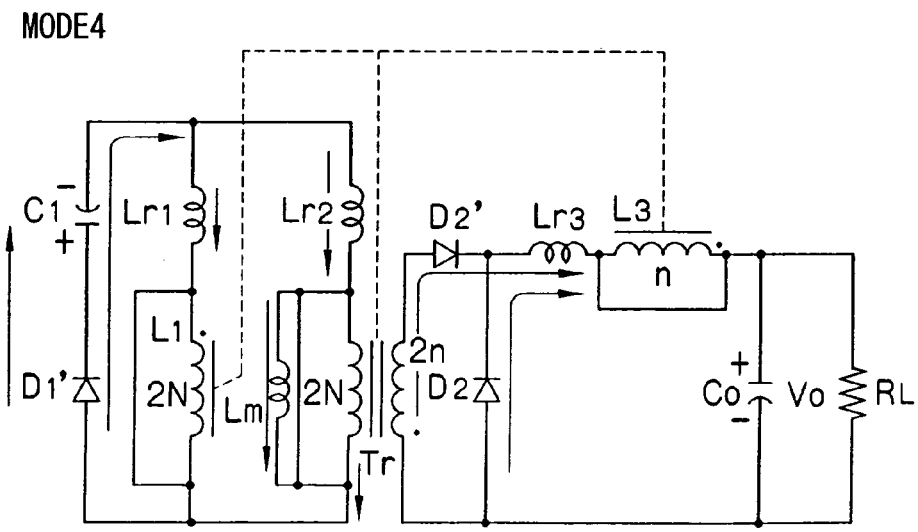
FIG. 22 is an equivalent circuit diagram showing the operation of mode 4 in the DC/DC converter of FIG. 16.

In the period of mode 4, the body diode D1' of the switching device Q1' is forward biased at t=t3 as shown in FIG. 22, the current ID2 decreases, the current ID2' increases, and the current ID2 becomes zero while the body diodes D2 and D2' remain turned on.

[5] Mode 5; $t4 \leq t \leq t5$

Figure 23:
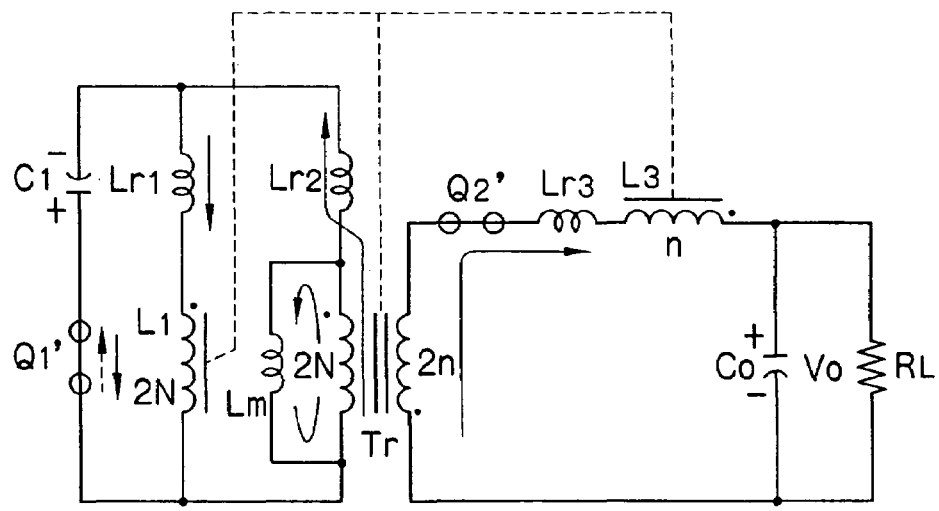
FIG. 23 is an equivalent circuit diagram showing the operation of mode 5 in the DC/DC converter of FIG. 16.

In the period of mode 5, the body diode D2 is turned off at t=t4 and the switching device Q1' is turned off at t=t5 as shown in FIG. 23. In mode 5, the switching devices Q1' and Q2' are both turned on. The direction of the current of the switching device Q1' is changed from negative (dotted arrow in FIG. 23) to positive (solid arrow in FIG. 23). Further, at t=t4, the windings of the transformer Tr are released from a short circuit and winding voltage is generated.

[6] Mode 6; $t5 \leq t \leq t6$

Figure 24:
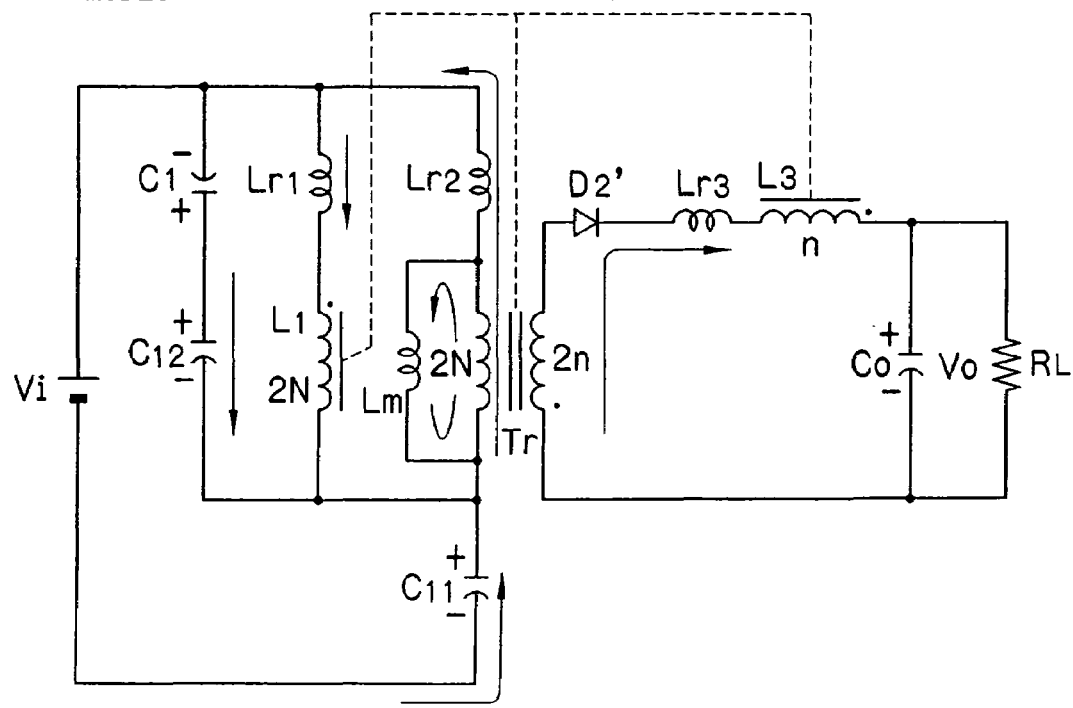
FIG. 24 is an equivalent circuit diagram showing the operation of mode 6 in the DC/DC converter of FIG. 16.

When the switching device Q1' is turned off at t=t5, as shown in FIG. 24, current continues flowing into the leakage inductances Lr1 and Lr2, so that the current is fed to a load current, the output junction capacity C1 is discharged to the input voltage Vi, and the output junction capacity C12 is charged to the voltage Vc1 of the clamp capacitor C1.

[7] Mode 7; $t6 \leq t \leq t7$

Figure 25:
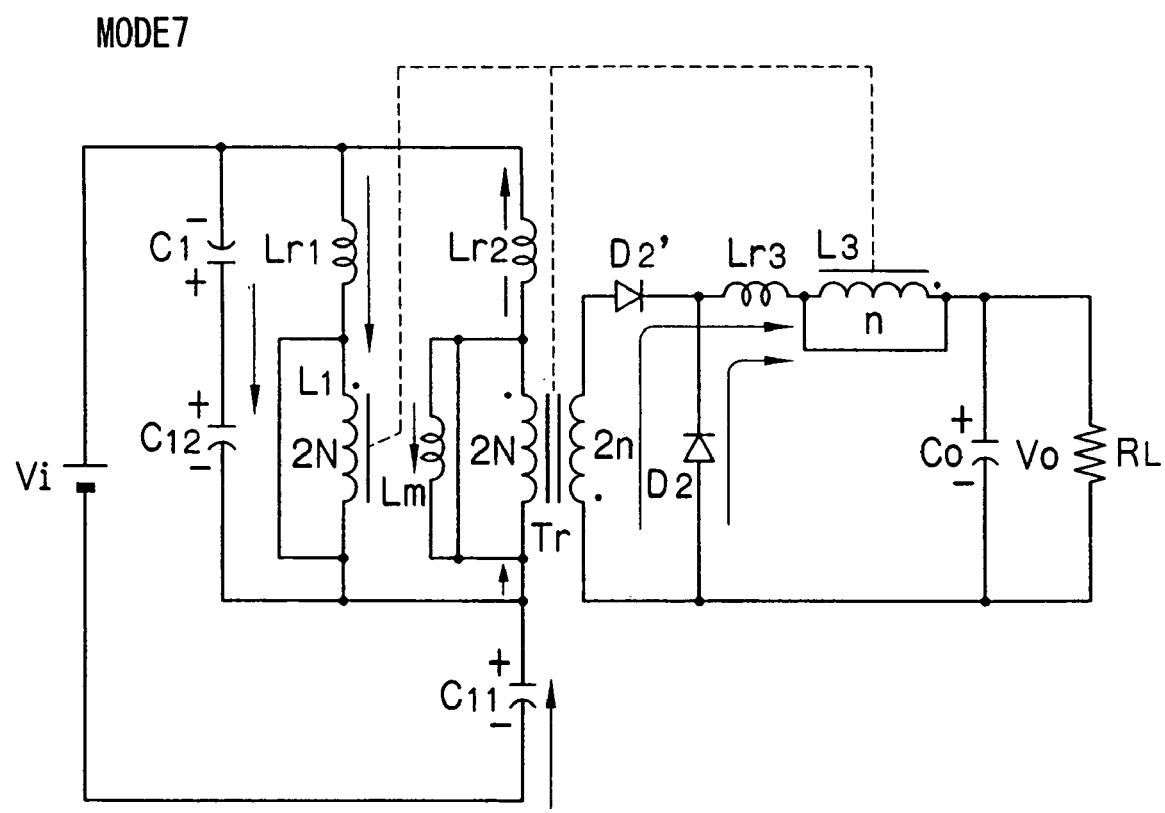
FIG. 25 is an equivalent circuit diagram showing the operation of mode 7 in the DC/DC converter of FIG. 166.

When the voltage Vc12 of the output junction capacity C12 becomes equal to the voltage Vc1 (Vc12=Vc1) at t=t6, the body diodes D2 and D2' are both turned on as shown in FIG. 25 and the secondary side of the transformer Tr is short-circuited. Hence, only the leakage inductances Lr1 and Lr2 act as inductances and resonate.

[8] Mode 8; $t7 \leq t \leq t8$

Figure 26:
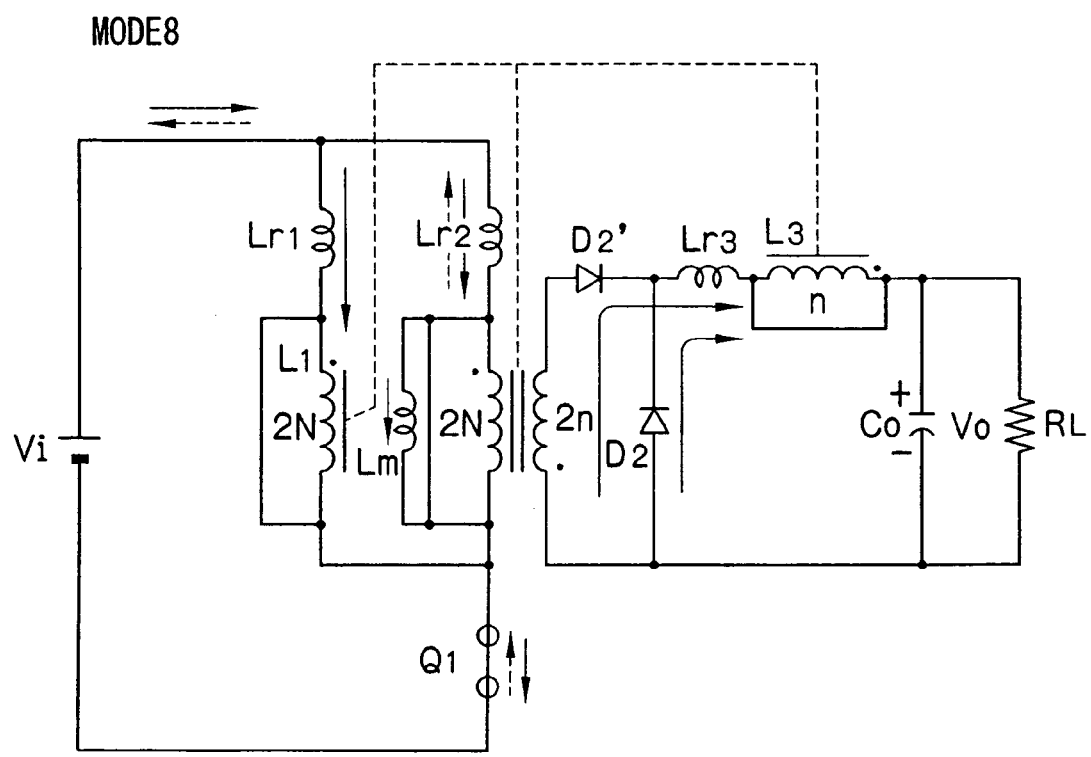
FIG. 26 is an equivalent circuit diagram showing the operation of mode 8 in the DC/DC converter of FIG. 16.

The body diode D1 of the switching device Q1 is forward biased and is turned on at t=t7 (FIG. 26). The current ID2' decreases and the current ID2 increases while the body diodes D2 and D2' remain turned on. When the current ID2' decreases to 0, a transition is made to mode 1. During the period of mode 8, the direction of the current of the switching device Q1 is changed from negative (dotted arrow in FIG. 26) to positive (solid arrow in FIG. 26).

According to the switching DC/DC converter in the present embodiment of the present invention, the input choke coil L1, the output choke coil L3, and the transformer Tr are integrated as a single component. Thus, it is possible to reduce the number of components as compared with the conventional circuit configuration.

Figure 27:
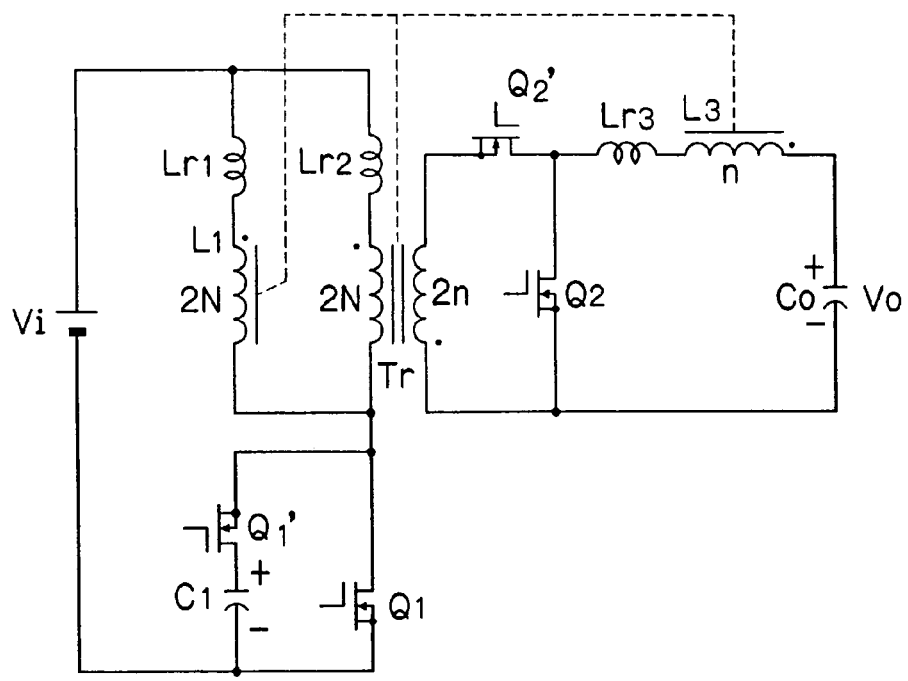
FIG. 27 is a circuit diagram showing Embodiment 7 of the present invention.
Figure 28:
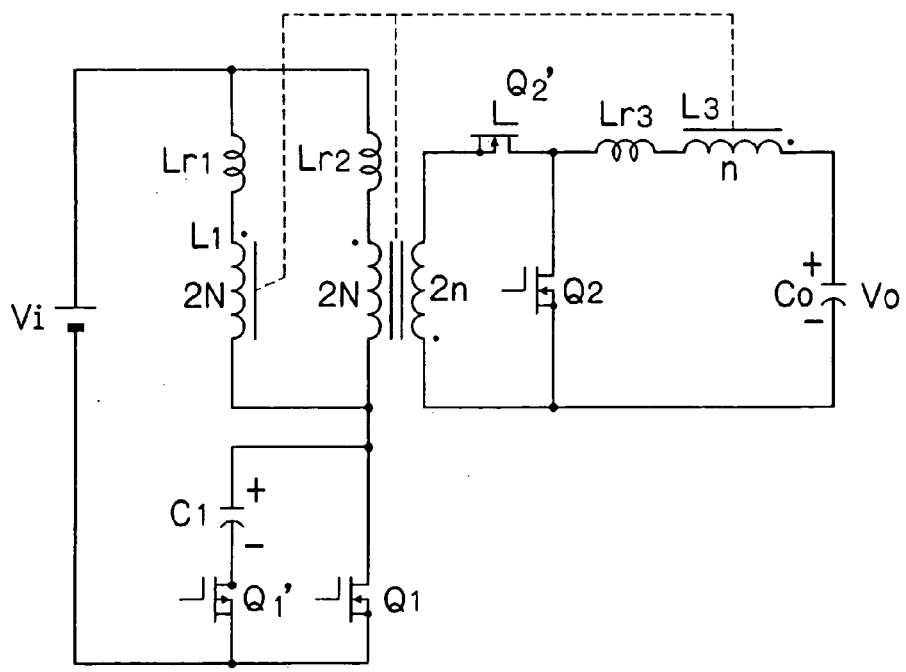
FIG. 28 is a circuit diagram showing Embodiment 8 of the present invention.
Figure 29:
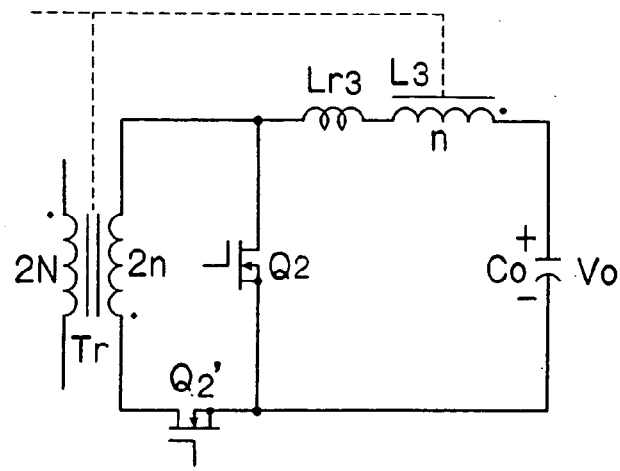
FIG. 29 is a circuit diagram showing Embodiment 9 of the present invention.

The applicable range of the present invention is not limited to the circuit configuration of FIG. 16 and various modifications are possible. FIGS. 27 to 29 show modification examples of the circuit. Main differences of the circuits from the circuit of FIG. 16 will be discussed below and the explanation of circuit operations is omitted. In FIGS. 16, 27, and 28, the switching device Q1 is inserted under a DC bus. The switching device Q1 may be inserted on the DC bus.

The circuit of FIG. 27 is different from the circuit of FIG. 16 in the connecting point of the series circuit of the capacitor C1 and the switching device Q1'. In FIG. 27, the series circuit of the switching device Q1' and the capacitor C1 is connected across the terminals of the switching device Q1.

The circuit of FIG. 28 is different from that of FIG. 27 in that the connecting order of the capacitor C1 and the switching device Q1' is reversed and a P-channel MOSFET is used for the switching device Q1'.

Furthermore, the configuration shown in FIG. 29 is also applicable as the secondary circuit of the transformer Tr. A circuit configuration shown in any one of FIGS. 16, 27, and 28 can be used as the primary circuit of the transformer Tr (not shown in FIG. 29). The circuit of FIG. 29 is different from that of FIG. 1 in the connecting point of the switching device Q2'.

Figure 30:
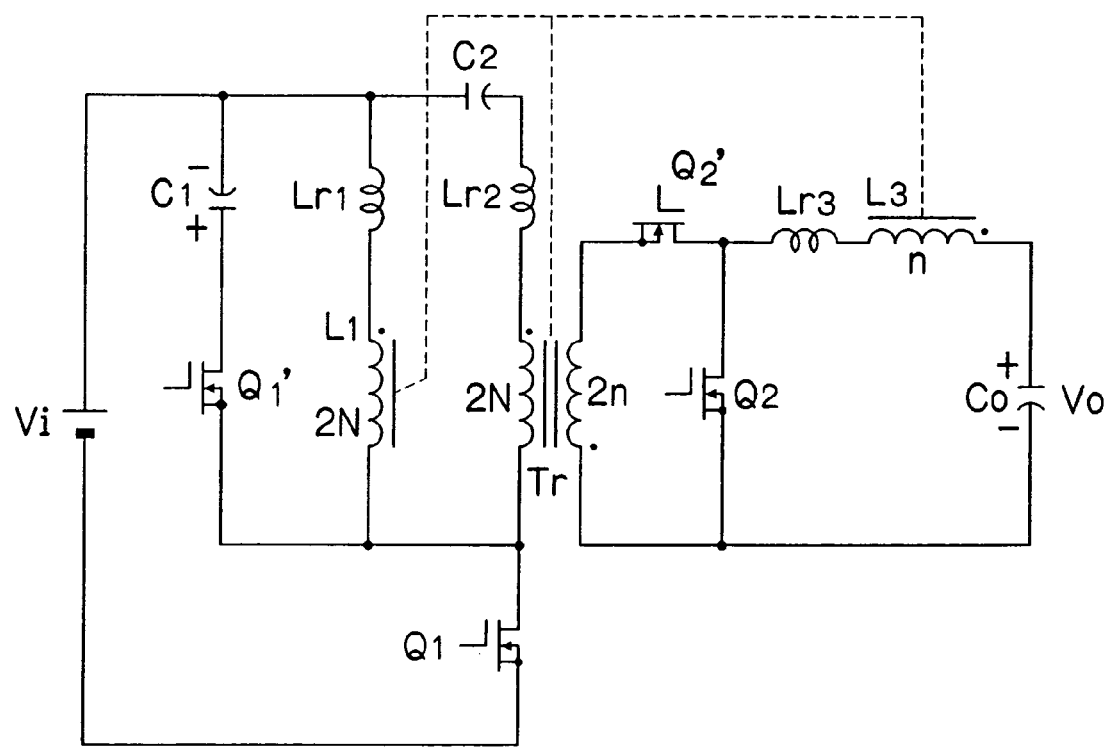
FIG. 30 is a circuit diagram showing Embodiment 10 of the present invention.
Figure 31:
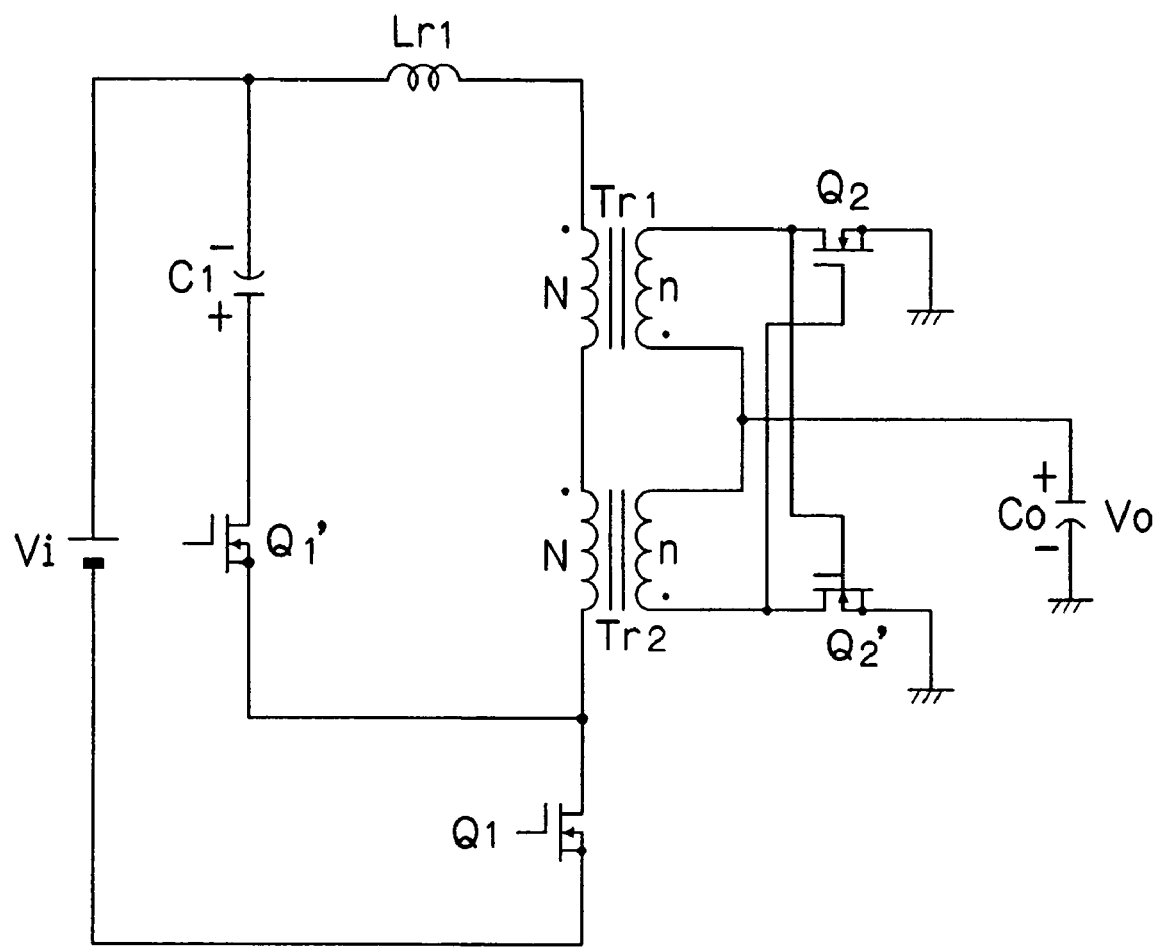
FIG. 31 is a circuit diagram showing an example of a conventional DC/DC converter.
Figure 32:
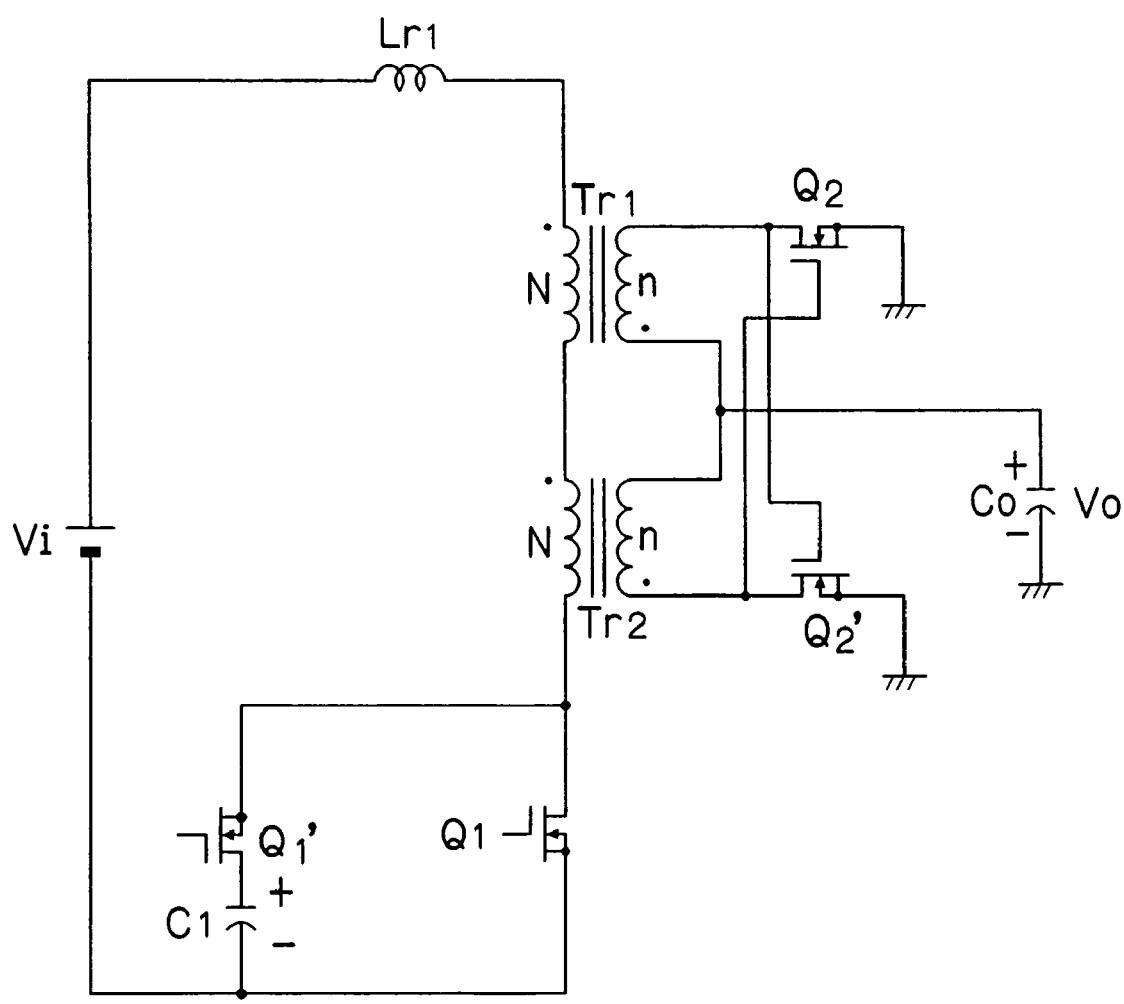
FIG. 32 is a circuit diagram showing another example of the conventional DC/DC converter.
Figure 33:
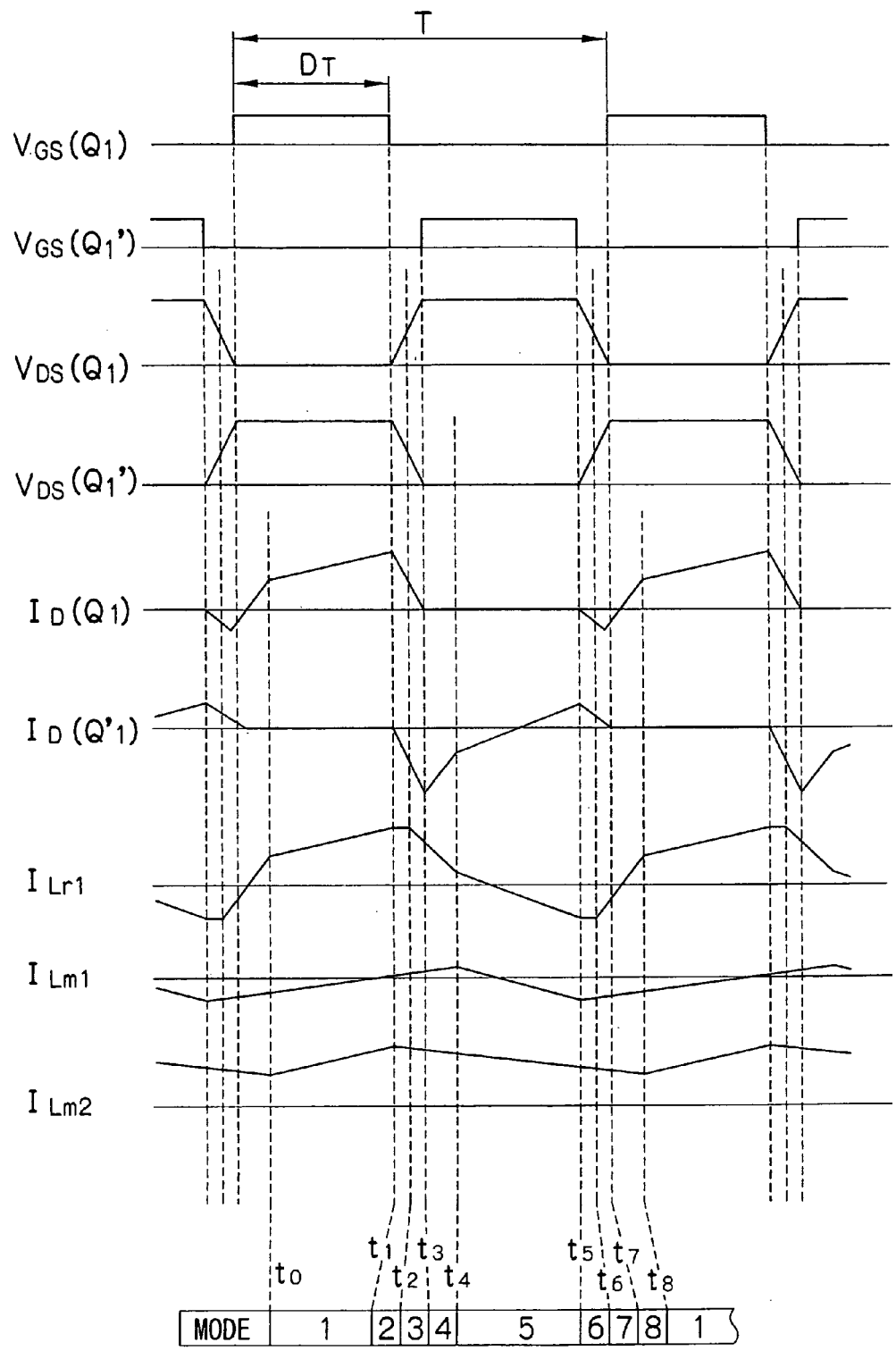
FIG. 33 is a diagram showing the operation waveforms of the parts of the conventional circuit shown in FIG. 31.
Figure 34:
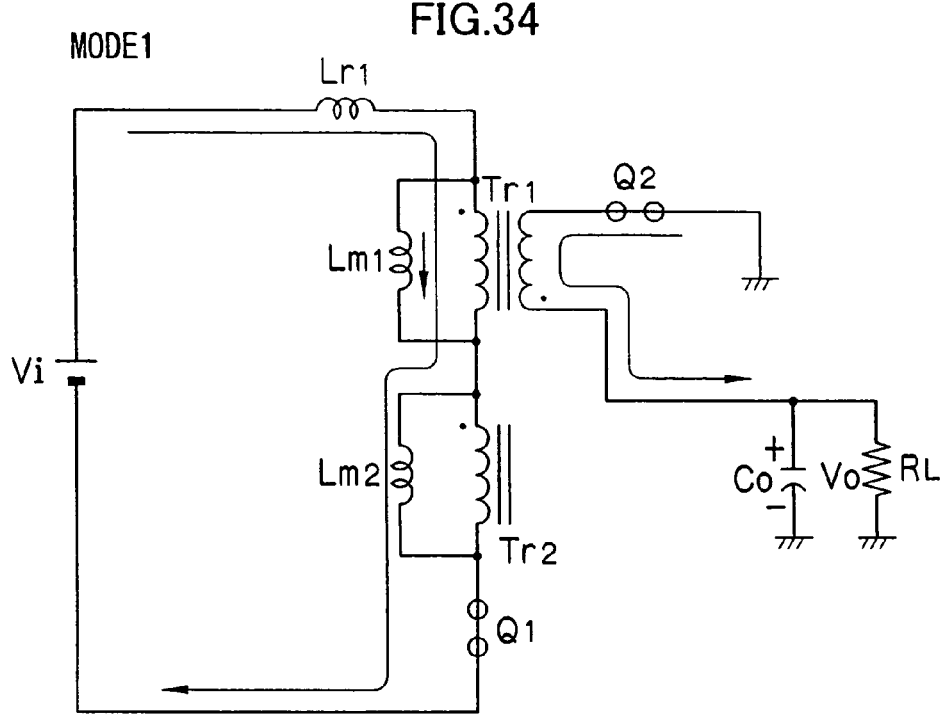
FIG. 34 is an equivalent circuit diagram showing the operation of mode 1 in the conventional DC/DC converter of FIG. 31.
Figure 35:
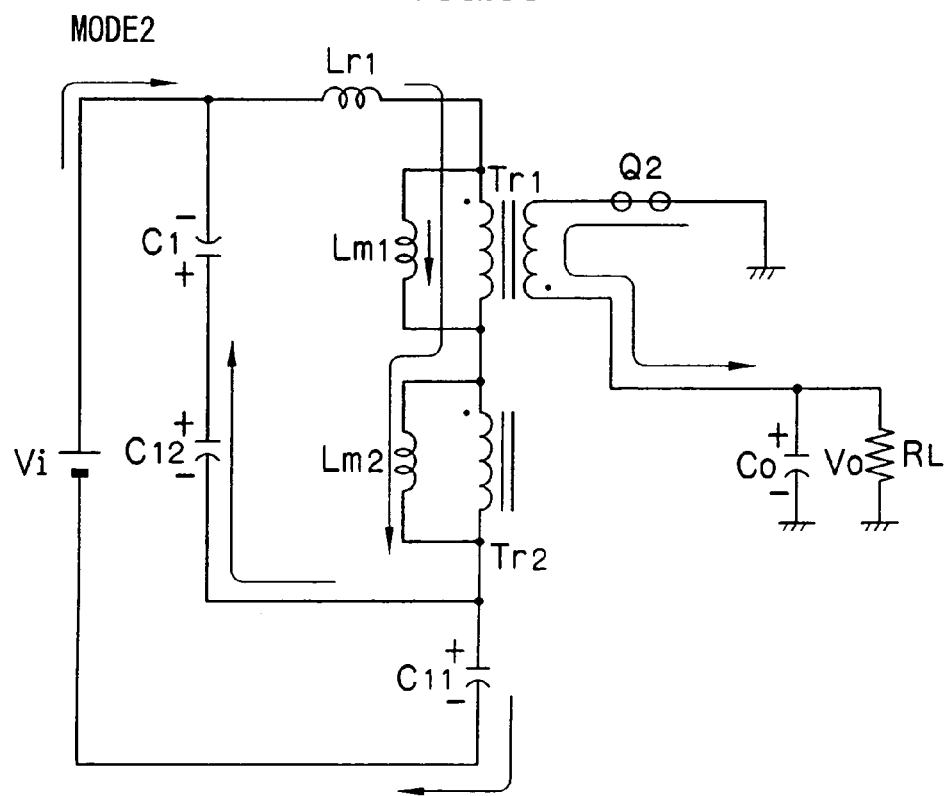
FIG. 35 is an equivalent circuit diagram showing the operation of mode 2 in the conventional DC/DC converter of FIG. 31.
Figure 36:
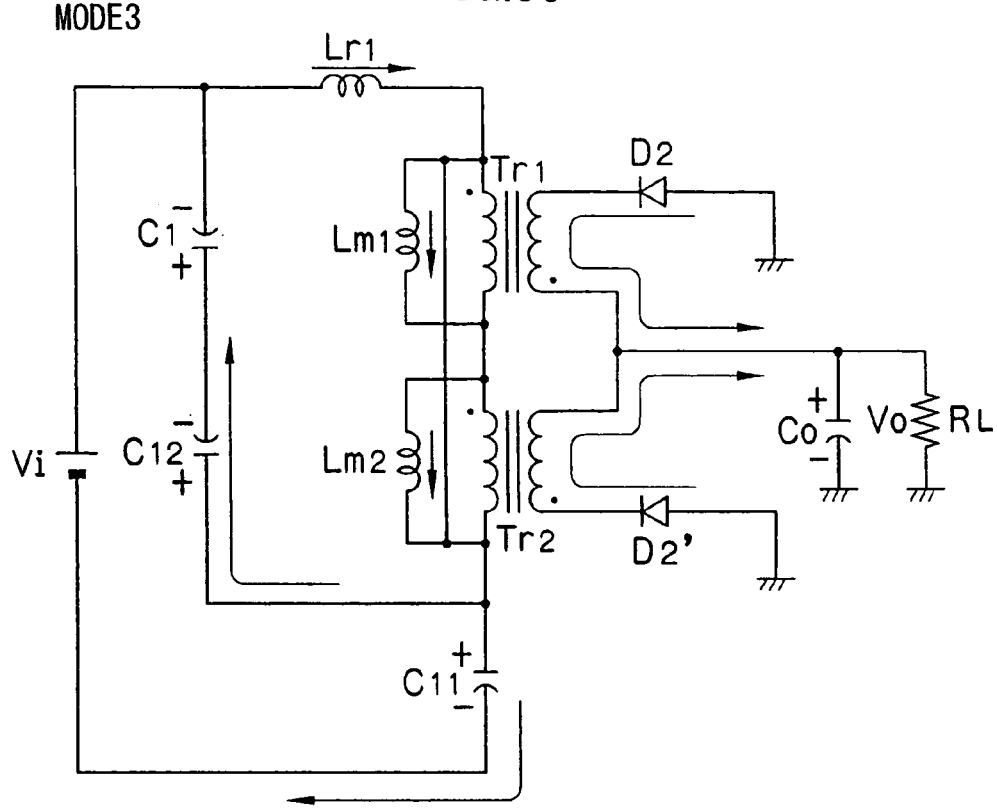
FIG. 36 is an equivalent circuit diagram showing the operation of mode 3 in the conventional DC/DC converter of FIG. 31.
Figure 37:
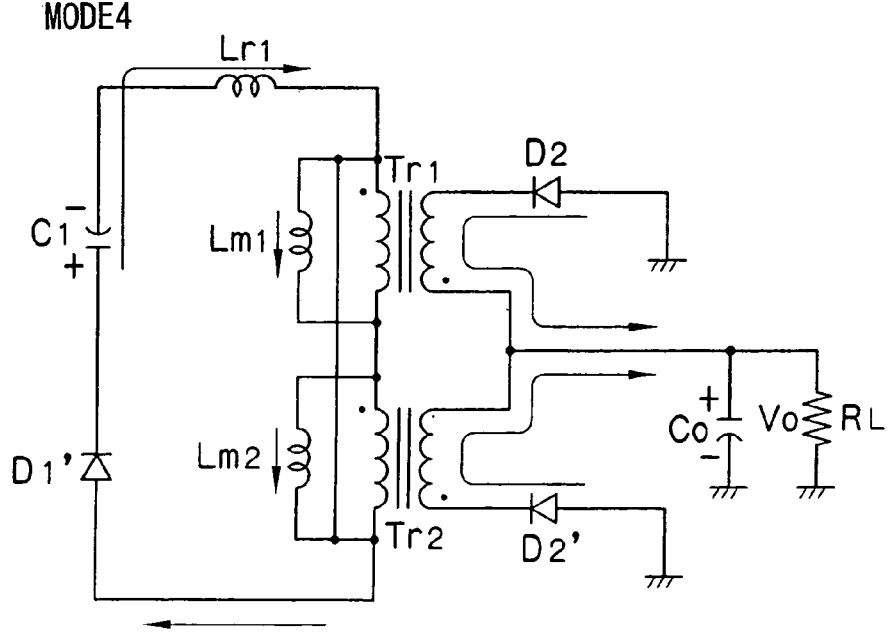
FIG. 37 is an equivalent circuit diagram showing the operation of mode 4 in the conventional DC/DC converter of FIG. 31.
Figure 38:
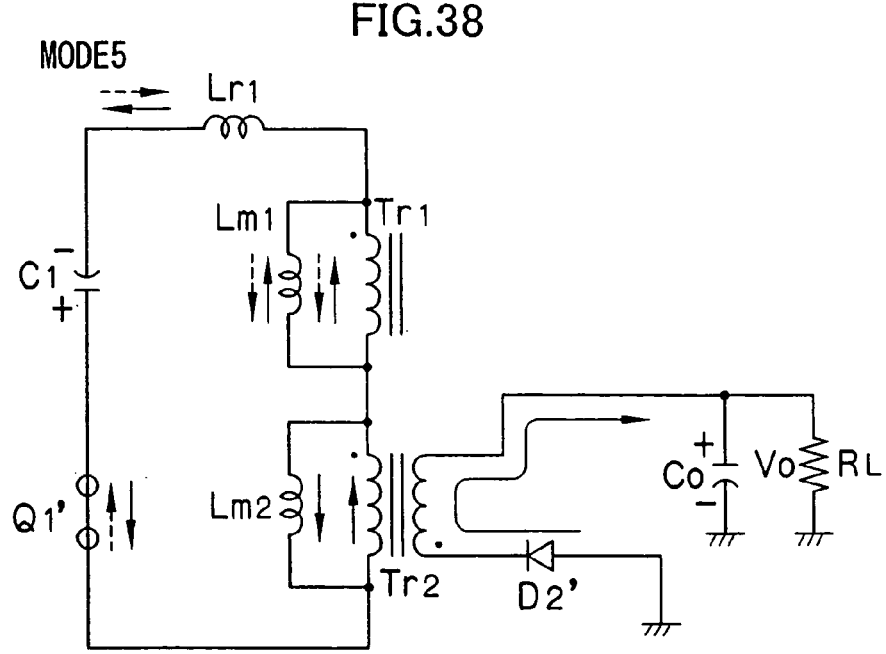
FIG. 38 is an equivalent circuit diagram showing the operation of mode 5 in the conventional DC/DC converter of FIG. 31.
Figure 39:
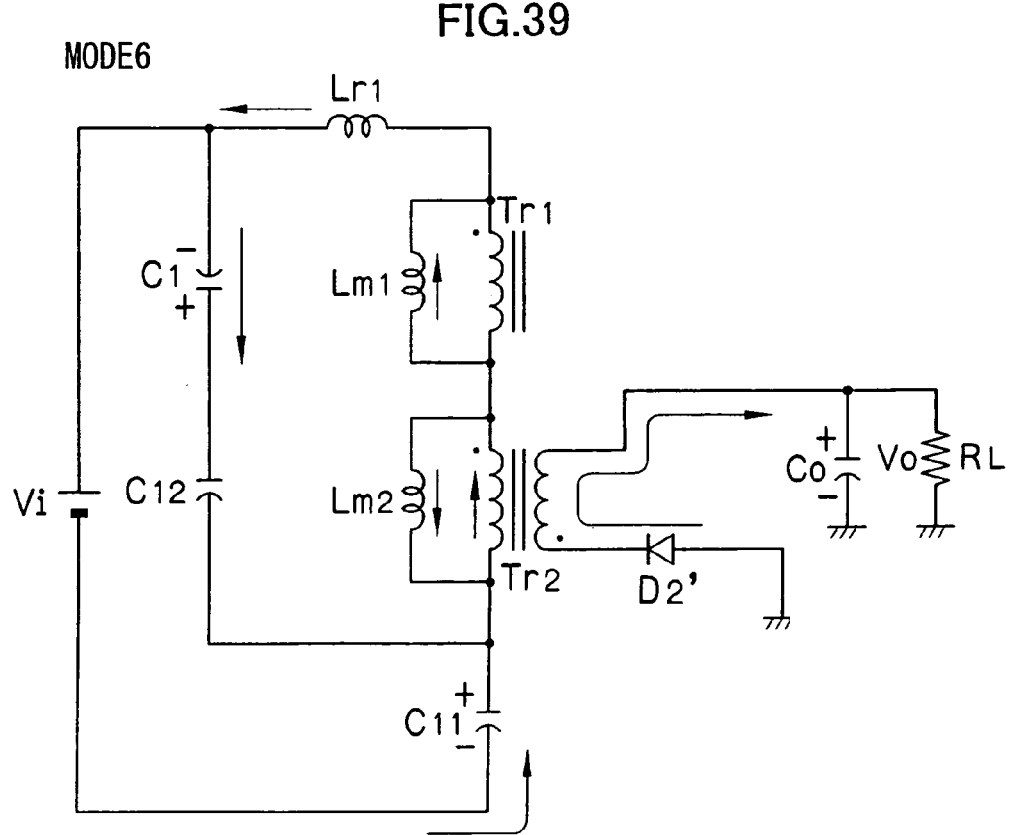
FIG. 39 is an equivalent circuit diagram showing the operation of mode 6 in the conventional DC/DC converter of FIG. 31.
Figure 40:
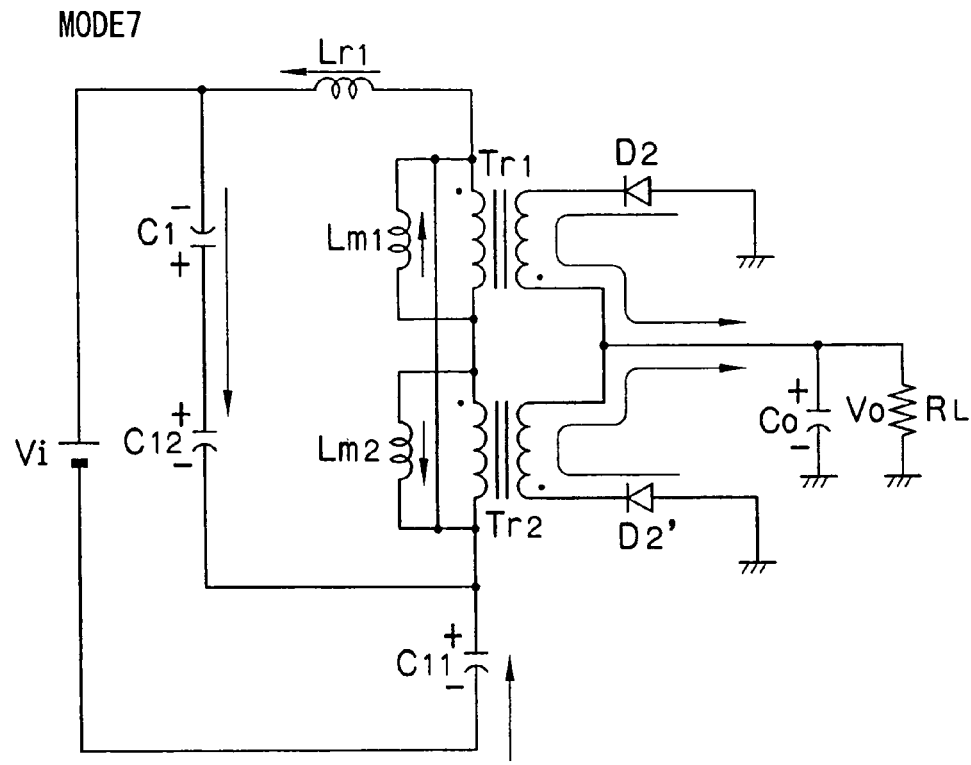
FIG. 40 is an equivalent circuit diagram showing the operation of mode 7 in the conventional DC/DC converter of FIG. 31.
Figure 41:
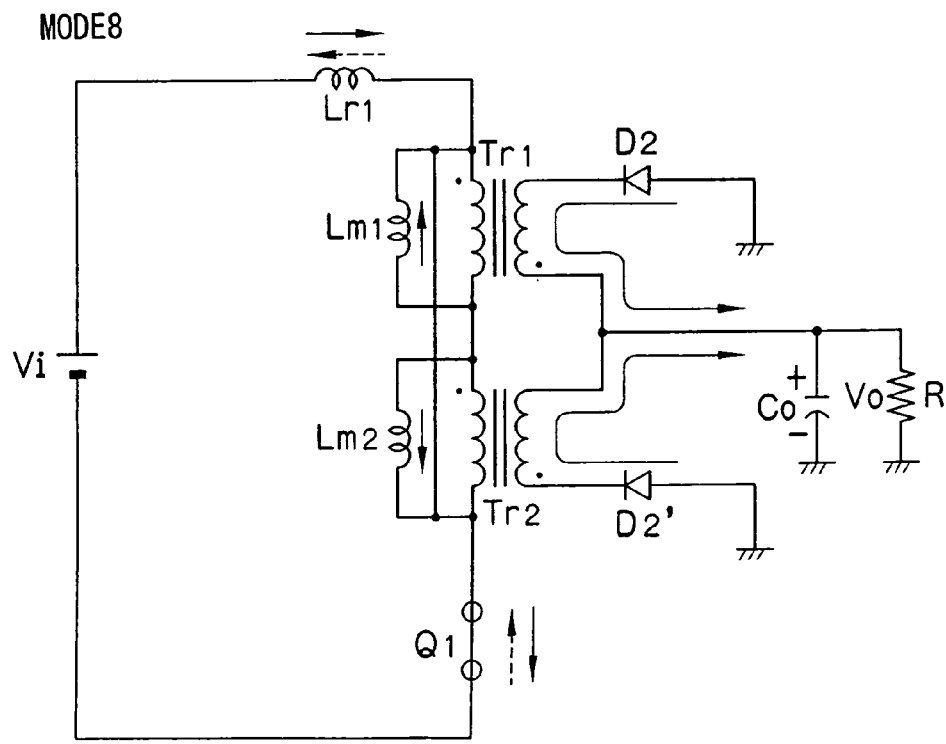
FIG. 41 is an equivalent circuit diagram showing the operation of mode 8 in the conventional DC/DC converter of FIG. 31.

FIG. 30 is a circuit diagram showing still another embodiment of the present invention. In FIG. 30, parts similar to those of FIG. 16 are indicated by the same reference numerals and the explanation thereof is omitted. In FIG. 30, in order to prevent the DC bias magnetization of a transformer Tr, a capacitor C2 is inserted in series with the primary winding (primary coil Np) of the transformer.

FIG. 30 shows an example where a capacitor C2 is added to the circuit diagram of FIG. 16. Similarly in the circuit diagrams of FIGS. 27 and 28, the capacitor C2 can be inserted in series with the primary winding (primary coil Np) of the transformer.

The present invention is particularly beneficial to vehicles such as an electric vehicle and a hybrid car with a wide range, a high input voltage, a large capacity, and a low output voltage (e.g. input voltage: DC 200 to 400 V, output voltage: 15 V). As a matter of course the applicable range of the present invention is not particularly limited and the present invention is also applicable to power supplies for various uses and specifications.

What is claimed is:

1. An insulating switching DC/DC converter, in which a DC voltage source is connected to a primary side of an insulating transformer, voltage is transformed by alternately turning on/off a first switching device and a second switching device so as not to simultaneously turn on the switching devices, the first and second switching devices being connected to the primary side, and an output of DC voltage is obtained via a secondary rectifier circuit of the insulating transformer, comprising:
   an input choke coil,
   an output choke coil, and
   the insulating transformer, wherein
   the input choke coil, a primary coil of the insulating transformer, a secondary coil of the insulating transformer, and the output choke coil are wound around a common core, and the coils are arranged in directions of canceling DC fluxes generated by windings of the coils, and wherein
   a primary circuit is formed on the primary side of the insulating transformer, the primary circuit including the first switching device connected in series with the primary coil, the input choke coil connected across terminals of the primary coil, and a series circuit of a clamp capacitor and the second switching device which are connected across the terminals of the primary coil, and
   a secondary circuit is formed on a secondary side of the insulating transformer, the secondary circuit including a first rectifying device and a second rectifying device which are connected to the secondary coil, the output choke coil connected to the first and second rectifying devices, and an output smoothing capacitor connected to the output choke coil.

2. An insulating switching DC/DC converter, in which a DC voltage source is connected to a primary side of an insulating transformer, voltage is transformed by alternately turning on/off a first switching device and a second switching device so as not to simultaneously turn on the switching devices, the first and second switching devices being connected to the primary side, and an output of DC voltage is obtained via a secondary rectifier circuit of the insulating transformer, comprising:
   an input choke coil,
   an output choke coil, and
   the insulating transformer, wherein
   the input choke coil, a primary coil of the insulating transformer, a secondary coil of the insulating transformer, and the output choke coil are wound around a common core, and the coils are arranged in directions of canceling DC fluxes generated by windings of the coils, and wherein
   a primary circuit is formed on the primary side of the insulating transformer, the primary circuit including the first switching device connected in series with the primary coil, the input choke coil connected across terminals of the primary coil, and a series circuit of a clamp-capacitor and the second switching device which are connected across the terminals of the first switching device, and
   a secondary circuit is formed on a secondary side of the insulating transformer, the secondary circuit including a first rectifying device and a second rectifying device which are connected to the secondary coil, the output choke coil connected to the first and second rectifying devices, and an output smoothing capacitor connected to the output choke coil.

3. The insulating switching DC/DC converter according to claim 1, wherein the input choke coil and the primary coil of the insulating transformer have the same number of turns N (N is a natural number), and the secondary coil of the insulating transformer and the output choke coil have the same number of turns n (n is a natural number).

4. The insulating switching DC/DC converter according to claim 1, wherein a MOSFET is used for the first and second switching devices and the first and second rectifying devices.

5. The insulating switching DC/DC converter according to claim 1, wherein a capacitor is connected in series with the primary coil of the insulating transformer in order to prevent a DC bias magnetization of the insulating transformer.

6. The insulating switching DC/DC converter according to claim 1, wherein in order to differentiate the input choke coil from the primary coil of the insulating transformer beforehand, the coils are designed so as to have a difference in a degree of connection with the secondary coil of the transformer, so that the primary coil of the insulating transformer has a higher degree of connection and the input choke coil has a lower degree of connection.

7. An insulating switching DC/DC converter, in which a DC voltage source is connected to a primary side of an insulating transformer, voltage is transformed by alternately turning on/off a first switching device and a second switching device so as not to simultaneously turn on the switching devices, the first and second switching devices being connected to the primary side, and an output of DC voltage is obtained via a secondary rectifier circuit of the insulating transformer, comprising:

an input choke coil, an output choke coil, and the insulating transformer, wherein the input choke coil, a primary coil of the insulating transformer, a secondary coil of the insulating transformer, and the output choke coil are wound around a common core, and wherein a primary circuit is formed on the primary side of the insulating transformer, the primary circuit including the first switching device connected in series with the primary coil, the input choke coil connected across terminals of the primary coil, and a series circuit of a clamp capacitor and the second switching device which are connected across the terminals of the primary coil, and a secondary circuit is formed on a secondary side of the insulating transformer, the secondary circuit including a first rectifying device and a second rectifying device which are connected to the secondary coil, the output choke coil connected to the first and second rectifying devices, and an output smoothing capacitor connected to the output choke coil.

8. An insulating switching DC/DC converter, in which a DC voltage source is connected to a primary side of an insulating transformer, voltage is transformed by alternately turning on/off a first switching device and a second switching device so as not to simultaneously turn on the switching devices, the first and second switching devices being connected to the primary side, and an output of DC voltage is obtained via a secondary rectifier circuit of the insulating transformer, comprising:

an input choke coil, an output choke coil, and the insulating transformer, wherein the input choke coil, a primary coil of the insulating transformer, a secondary coil of the insulating transformer, and the output choke coil are wound around a common core, and wherein a primary circuit is formed on the primary side of the insulating transformer, the primary circuit including the first switching device connected in series with the primary coil, the input choke coil connected across terminals of the primary coil, and a series circuit of a clamp capacitor and the second switching device which are connected across the terminals of the first switching device, and a secondary circuit is formed on a secondary side of the insulating transformer, the secondary circuit including a first rectifying device and a second rectifying device which are connected to the secondary coil, the output choke coil connected to the first and second rectifying devices, and an output smoothing capacitor connected to the output choke coil.

9. The insulating switching DC/DC converter according to claim 7, wherein the input choke coil and the primary coil of the insulating transformer have the same number of turns 2N (N is a natural number), the secondary coil of the insulating transformer has the number of turns 2n (n is a natural number), and the output choke coil has the number of turns n.

10. The insulating switching DC/DC converter according to claim 7, wherein a MOSFET is used for the first and second switching devices and the first and second rectifying devices.

11. The insulating switching DC/DC converter according to claim 7, wherein a capacitor is connected in series with the primary coil of the insulating transformer in order to prevent a DC bias magnetization of the insulating transformer.

12. The insulating switching DC/DC converter according to claim 7, wherein in order to differentiate the input choke coil from the primary coil of the insulating transformer beforehand, the coils are designed so as to have a difference in a degree of connection with the secondary coil of the transformer, so that the primary coil of the insulating transformer has a higher degree of connection and the input choke coil has a lower degree of connection.

* * * * *